United States Patent [19]

Jessen et al.

[11] Patent Number: 5,245,020
[45] Date of Patent: Sep. 14, 1993

[54] REACTIVE DYES WITH TWO OR THREE NITROGEN-CONTAINING HALOHETEROCYCLES AS REACTIVE SYSTEM

[75] Inventors: Joerg L. Jessen, Speyer; Klaus Pandl, Ludwigshafen; Hermann Loeffler, Speyer; Bernd Siegel, Ludwigshafen; Manfred Patsch, Wachenheim, all of Fed. Rep. of Germany

[73] Assignee: BASF Aktiengesellschaft, Ludwigshafen, Fed. Rep. of Germany

[21] Appl. No.: 853,518

[22] Filed: Mar. 18, 1992

Related U.S. Application Data

[62] Division of Ser. No. 490,710, Mar. 8, 1990, Pat. No. 5,149,789.

[30] Foreign Application Priority Data

Apr. 1, 1989 [DE] Fed. Rep. of Germany ....... 3910649

[51] Int. Cl.$^5$ .................... C09B 62/09; C09B 62/04; D06P 1/382
[52] U.S. Cl. .................................. 534/618; 534/634
[58] Field of Search ...................... 534/618, 624, 634

[56] References Cited

U.S. PATENT DOCUMENTS

| | | | |
|---|---|---|---|
| 3,664,995 | 5/1972 | Andrew et al. | 534/634 X |
| 3,926,942 | 12/1975 | Yelland | 534/618 |
| 4,556,706 | 12/1985 | Hegar et al. | 534/618 |
| 5,041,540 | 8/1991 | Pandl et al. | 534/618 |
| 5,149,789 | 9/1992 | Jessen et al. | 534/634 X |

FOREIGN PATENT DOCUMENTS

| | | |
|---|---|---|
| 315045 | 5/1989 | European Pat. Off. ............ 534/618 |
| 1530104 | 10/1978 | United Kingdom . |
| 2007701 | 5/1979 | United Kingdom . |
| 1555836 | 11/1979 | United Kingdom . |

*Primary Examiner*—Mary C. Lee
*Assistant Examiner*—Fiona T. Powers
*Attorney, Agent, or Firm*—Oblon, Spivak, McClelland, Maier & Neustadt

[57] ABSTRACT

Reactive dyes of the formula

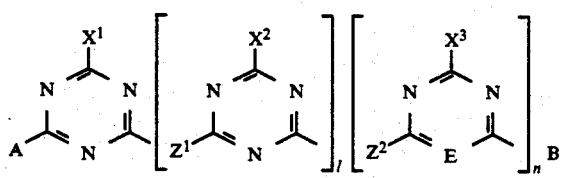

where
l is 0 or 1,
n is 0 or 1,
E is nitrogen or C—Cl
A is the radical of an azo dye attached to the triazine ring via an imino or $C_1$-$C_4$-alkylimido group,
B—if E is nitrogen—is the radical of an azo dye or of a formazan dye which in either case is bonded to the triazine ring via an imino of $C_1$-$C_4$-alkylimino group or else—if n is 0—is fluorine, chlorine or unsubstituted or substituted amino, or—if E is C—Cl—is fluorine, chlorine or methyl,
$X^1$ and $X^2$ are independently of the other fluorine or chlorine,
$X^3$ is fluorine or chlorine or else—if E is C—Cl—methylsulfonyl and
$Z^1$ and $Z^2$ are independently of the the other a radical of the formula

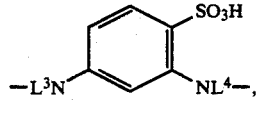

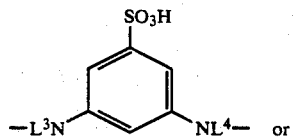

or (Abstract continued on next page.)

-continued

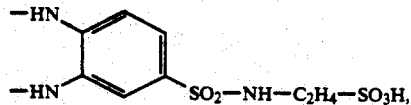

where $L^3$ and $L^4$ are independently of the other hydrogen or unsubstituted or substituted $C_1$–$C_4$-alkyl, with the proviso that l and n are not simultaneously 0 and that, if E is C—Cl or if n is 0 and $Z^1$ is the radical of the formula

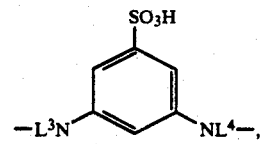

where $L^3$ and $L^4$ are each as defined above, A may also be the radical of a formazan dye which is bonded to the triazine ring via an imino or $C_1$–$C_4$-alkylimino group, are useful for dyeing or printing hydroxyl- or nitrogen-containing substrates.

2 Claims, No Drawings

REACTIVE DYES WITH TWO OR THREE NITROGEN-CONTAINING HALOHETEROCYCLES AS REACTIVE SYSTEM

This is a division of application Ser. No. 07/490,710, filed on Mar. 8, 1990, now U.S. Pat. No. 5,149,789.

The present invention relates to novel reactive dyes of the formula I

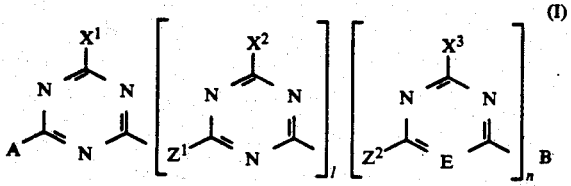

where
l is 0 or 1,
n is 0 or 1,
E is nitrogen or C—Cl,
A is the radical of an azo dye attached to the triazine ring via an imino or $C_1$–$C_4$-alkylimino group,
B—if E is nitrogen—is the radical of an azo dye or of a formazan dye which in either case is bonded to the triazine ring via an imino or $C_1$–$C_4$-alkylimino group or else—is n is 0—is fluorine, chlorine or $NL^1L^2$, where $L^1$ and $L^2$ are identical or different and each is independently of the other hydrogen or unsubstituted or cyano-, hydroxyl-, or hydroxysulfonyl-substituted $C_1$–$C_4$-alkyl or one of $L^1$ and $L^2$ is phenyl which may be substituted by hydroxysulfonyl, sulfamoyl, $C_1$–$C_4$-monoalkyl- or -dialkyl-sulfamoyl (which alkyl may be substituted by hydroxyl or hydroxysulfonyl), morpholinosulfonyl, $C_1$–$C_4$-alkyl, halogen, cyano or by $C_1$–$C_4$-alkoxy, or $L^1$ and $L^2$ together with the nitrogen atom linking them are a 5- or 6-membered saturated heterocyclic radical which may have further hetero atoms, or—if E is C—Cl—is fluorine, chlorine, or methyl,
$X^1$ and $X^2$ are identical or different and each is independently of the other fluorine or chlorine,
$X^3$ is fluorine or chlorine or else—if E is C—Cl—methylsulfonyl and
$Z^1$ and $Z^2$ are identical or different and each is independently of the other a radical of the formula

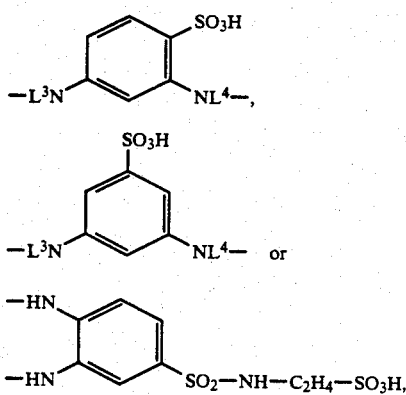

where $L^3$ and $L^4$ are identical or different and each is independently of the other hydrogen or unsubstituted or cyano- or hydroxy-substituted $C_1$–$C_4$-alkyl with the proviso that l and n are not simultaneously 0 and that, if E is C—Cl or if n is 0 and $Z^1$ is the radical of the formula

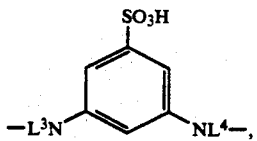

where $L^3$ and $L^4$ are each as defined above, A may also be the radical of a formzan dye which is bonded to the triazine ring via an imino or $C_1$–$C_4$-alkylimino group, and the use of the novel dyes for dyeing or printing hydroxyl- or nitrogen-containing substrates.

Earlier patent applications EP-A-315 045 and DE-A-3 840 653 describe reactive dyes where the reactive system comprises two or three halotriazine radicals and where the chromophore is a copper formazan.

It is an object of the present invention to provide new reactive dyes having two or three halotriazine groups as reactive groups which would also have other chromophore systems and advantageous application properties.

We have found that this object is achieved by the above-defined reactive dyes of the formula I.

Any alkyl appearing in the formula I may be either straight-chain or branched.

$L^1$, $L^2$, $L^3$ and $L^4$ are each for example methyl, ethyl, propyl, isopropyl, butyl, isobutyl, sec-butyl, 2-cyanoethyl, 2- or 3-cyanopropyl, 1- or 2-cyano-2-propyl, 2- or 4-cyanobutyl, 2-hydroxyethyl, 2- or 3-hydroxypropyl or 2- or 4-hydroxybutyl.

$L^1$ and $L^2$ are each further for example 2-hydroxysulfonylethyl, 2- or 3-hydroxysulfonylpropyl or 2- or 4-hydroxysulfonylbutyl.

$NL^1L^2$ is for example amino, mono- or dimethylamino, mono- or diethylamino, mono- or dipropylamino, mono- or diisopropylamino, mono- or dibutylamino N-methyl-N-ethylamino, mono- or bis(2-cyanoethyl)amino, mono- or bis(2-hydroxyethyl)amino, N-ethyl-N(2-cyanoethyl)amino, N-ethyl-N-(2-hydroxyethyl)amino, 2-hydroxysulfonylethylamino, N-ethyl-N-(2-hydroxysulfonylethyl)amino, pyrrolidino, piperidino, morpholino, piperazino, N-($C_1$–$C_4$-alkyl)-piperazino, phenylamino, N-methyl-N-phenylamino, N-ethyl-N-phenylamino, (2-, 3- or 4-hydroxysulfonylphenyl)amino, (2,4- or 2,5-dihydroxysulfonylphenyl)amino, (2- or 3-methyl-4-hydroxysulfonylphenyl)amino, (2,5-dimethyl-4-hydroxysulfonylphenyl)amino, (5-chloro-2-hydroxysulfonylphenyl)amino, (4-methoxy-2-hydroxysulfonylphenyl)amino, (2-methoxy-4-hydroxysulfonylphenyl)amino, (2-chloro-5-hydroxysulfonylphenyl)amino, (2-methyl-5-hydroxysulfonylphenyl)amino, (2-ethyl-5-hydroxysulfonylphenyl)amino, (4-methoxy-3-hydroxysulfonylphenyl)amino, (4-chloro-3-hydroxysulfonylphenyl)amino, (4-methyl-3-hydroxysulfonylphenyl)amino, (2-chloro-3-methyl-5-hydroxysulfonylphenyl)amino, (2-chloro-4-methyl-5-hydroxysulfonylphenyl)amino, 3-sulfamoylphenylamino, 3-(M-methylsulfamoyl)phenylamino, 3-(N-ethylsulfamoyl)phenylamino, 3-(N,N-diethylsulfamoyl)phenylamino, 3-(N,N-diethylsulfamoyl)phenylamino, 3-[N-(2-hydroxyethyl)sulfamoyl]phenylamino, 3-[N,N-bis(2-hydroxyethyl)sulfamoyl]phenylamino, 3-morpholinosulfonylphenylamino, 3-[N-(2-hydroxysulfonylethyl)sulfamoyl]phenylamino, 4-chloro-3-sulfamoylphenylamino, 4-chloro-3-(N-methylsulfamoyl)phenylamino, 4-chloro-3-(N-ethylsulfamoyl)phenylamino, 4-chloro-3-(N,N-dimethylsulfamoyl)phenylamino, 4-chloro-3-(N,N-diethylsulfamoyl)phenylamino, 4-chloro-3-[N-(2-hydroxyethyl)sulfamoyl]phenylamino, 4-chloro-3-[N,N-bis(2-hydroxyethyl)sulfamoyl]phenylamino, 4-chloro-3-morpholinosulfonylphenylamino, 4-chloro-3-[N-(2-hydroxysulfonylethyl)sulfamoyl]phenylamino, 4-methyl-3-sulfamoylphenylamino, 4-methyl-3-(N-methylsulfamoyl)phenylamino, 4-methyl-3-(N-ethylsulfamoyl)phenylamino, 4-methyl-3-(N,N-dimethylsulfamoyl)phenylamino, 4-methyl-3-(N,N-diethylsulfamoyl)phenylamino, 4-methyl-3-[N-(2-hydroxyethyl)sulfamoyl]phenylamino, 4-methyl-3-[N,N-bis(2-hydroxyethyl)sulfamoyl]phenylamino, 4-methyl-3-morpholinosulfonylphenylamino or 4-methyl-3-[N-(2-hydroxysulfonylethyl)sulfamoyl]phenylamino.

If B in the formula I is the radical of an azo dye, it can be either identical to A or else different therefrom.

If B in the formula I is the radical of a formazan dye and if E is C—Cl or n is 0 and $Z^1$ is the radical of the formula

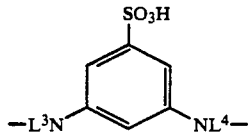

where $L^3$ and $L^4$ are each as defined above, it can be identical to the radical A or else different therefrom.

Preference is given to reactive dyes of the formula I where B is the radical of an azo dye or of a formazan dye which in either case is bonded to the triazine ring via an imino or $C_1$-$C_4$-alkylimino group or else—if n is 0—is $Nl^1L^2$, where $L^1$ and $L^2$ are each as defined above.

Particular preference is given to reactive dyes of the formula I where B is the radical of an azo dye which is bonded to the triazine ring via an imino or $C_1$-$C_4$-alkylimino group or else—if n is 0—is $NL^1L^2$, where $L^1$ and $L^2$ are each as defined above.

Of particular note are reactive dyes of the formula I where B is identical to A.

A and B in the formula I are each for example a metallized or unmetallized radical of an azo dye which possesses an imino or $C_1$-$C_4$-alkylimino group to which the triazine ring is attached. The amino-containing azo dyes underlying the novel reactive dyes of the formula I are known per se and have been descried in large numbers, for example in Venkataraman, The Chemistry of Synthetic Dyes, volume 6, pages 213–297, Academic Press, New York, London, 1972. The azo dyes which have an amino or $C_1$-$C_4$-monoalkylamino group to which the triazine ring is bonded conform to the formula III

D—N=N—K (—N=N—D)$_a$    (III)

where D is the radical of a diazo component, K is the radical of a coupling component and a is 0 or 1.

Useful dyes are for example water-soluble azo dyes, in particular monoazo dyes, of the formula III (a=0) which may possess hydroxysulfonyl and/or carboxyl groups.

Preference is given to nonmetallized azo dyes, in particular to those which contain sulfo and/or carboxyl groups, especially those which possess from 1 to 6 sulfo groups.

Important azo dyes are for example those of the phenyl-azo-naphthalene, phenyl-azo-1-phenylpyrazol-5-one, phenyl-azo-benzene, naphthyl-azo-benzene, phenyl-azo-aminonaphthalene, naphthyl-azo-naphthalene, naphthyl-azo-1-phenylpyrazol-5-one, phenyl-azo-pyridone, phenyl-azo-aminopyridine, napthyl-azo-pyridone, naphthyl-azo-aminopyridine or stilbyl-azo-benzene series.

Particular preference is given to reactive dyes of the formula I where E is nitrogen.

Particular preference is also given to reactive dyes of the formula I where A and/or B are each a radical of the formula IV

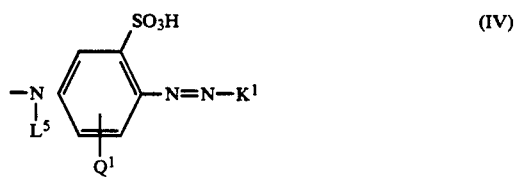

where $L^5$ is hydrogen or $C_1$-$C_4$-alkyl, $Q^1$ is hydrogen, $C_1$-$C_4$-alkyl, chlorine or hydroxysulfonyl, and $K^1$ is the radical of a coupling component of the naphthalene, pyrazolone, pyridine or hydroxypyrimidine series.

Particular preference is further given to the reactive dyes of the formula I where A and/or B are each a radical of the formula V

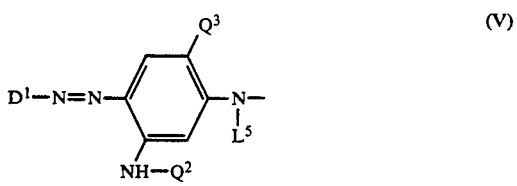

where $L^5$ is as defined above, $Q^2$ is a $C_1$-$C_4$-alkanoyl, carbamoyl, $C_1$-$C_4$-monoalkyl- or -dialkyl-carbamoyl, phenylcarbamoyl, or cyclohexylcarbamoyl, $Q^3$ is hydrogen, $C_1$-$C_4$-alkyl, $C_1$-$C_4$-alkoxy, hydroxysulfonyl or chlorine and $D^1$ is the radical of a diazo component of the aniline or naphthalene series.

Particular preference is further given to reactive dyes of the formula I where A and/or B are each a radical of the formula VI

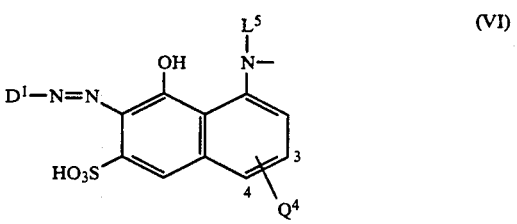

where $D^1$ and $L^5$ are each as defined above and $Q^4$ is hydroxysulfonyl in ring position 3 or 4.

Particular preference is further given to reactive dyes of the formula I where A and/or B are each a radical of the formula VII

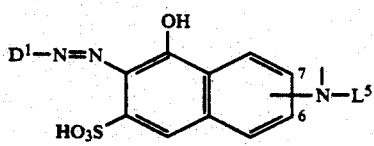

(VII)

where $D^1$ and $L^5$ are each as defined above and the —$NL^5$—group is in ring position 6 or 7.

Particular preference is further given to reactive dyes of the formula I where A and/or B are each a radical of the formula VIIIa or VIIIb

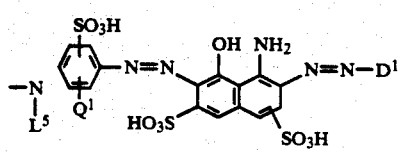

(VIIIa)

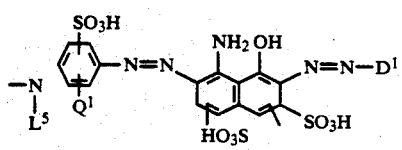

(VIIIb)

where $D^1$, $L^5$ and $Q^1$ are each as defined above.

Particular prefrence is further given to reactive dyes of the formula I where A and/or B are each a radical of the formula IX

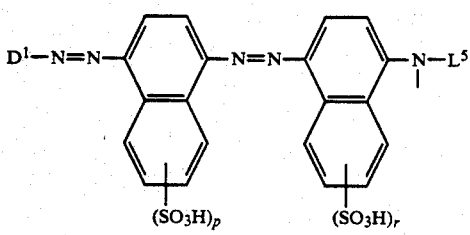

(IX)

where $D^1$ and $L^5$ are each as defined above and p and r are each 0, 1 or 2.

Aromatic radicals D of diazo components of the aniline and aminonaphthalene series are derived for example from amines of the formula X a-f

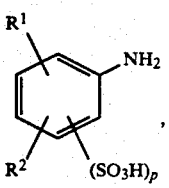

(Xa)

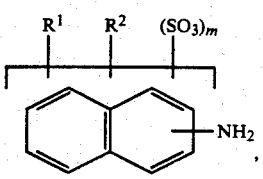

(Xb)

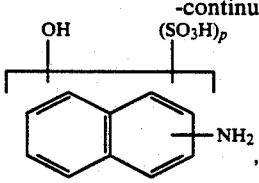

(Xc)

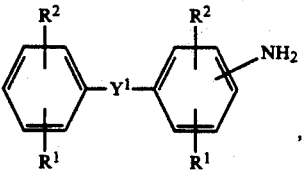

(Xd)

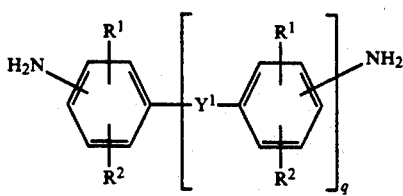

(Xe)

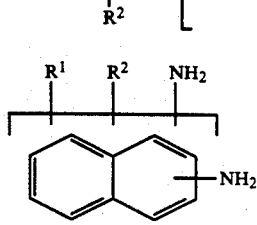

(Xf)

where
m is 0, 1, 2 or 3,
p is 0, 1 or 2,
q is 0 or 1,
$R^1$ is hydrogen, methyl, ethyl, methoxy, ethoxy, acetyl, cyano, carboxyl, hydroxysulfonyl, $C_1$-$C_4$-alkoxycarbonyl, hydroxyl, carbamoyl, $C_1$-$C_4$-mono- or dialkylcarbamoyl, fluorine, chlorine, bromine or trifluoromethyl,
$R^2$ is hydrogen, methyl, ethyl, methoxy, ethoxy, cyano, carboxyl, hydroxysulfonyl, acetylamino, $C_1$-$C_4$-alkoxycarbonyl, carbamoyl, $C_1$-$C_4$-monoalkyl- or dialkylcarbamoyl, fluorine, chlorine, nitro, sulfamoyl, $C_1$-$C_4$-monoalkyl- or dialkyl-sulfamoyl, $C_1$-$C_4$-alkylsulfonyl, phenylsulfonyl or phenoxy and
$Y^1$ is a direct bond, oxygen, sulfur or —NHCO—, —CONH—, —NH—CO—NH—, —CO—, —NH-$SO_2$—, —$SO_2$NH—, —$SO_2$—, —CH=CH—, —$CH_2$—$CH_2$, —$CH_2$—, —NH— or —N=N—.

Preference is given to those components where $R^1$ is hydrogen, methyl, methoxy, carboxyl, hydroxysulfonyl, hydroxyl or chlorine, $R^2$ is hydrogen, methyl, methoxy, carboxyl, hydroxysulfonyl, acetylamino or chlorine and $Y^1$ is —CO—, —$SO_2$—, —CH=CH—, —$CH_2$—$CH_2$—, —$CH_2$— or —N=N—.

Aromatic amines which are suitable for use as diazo components and which conform to the formula Xa, Xb, Xc or Xd are for example aniline, 2-methoxyaniline, 2-methylaniline, 4-chloro-2-aminoanisole, 4-methylaniline, 4-methoxyaniline, 2-methoxy-5-methylaniline, 2,5-dimethoxyaniline, 2,5-dimethylaniline, 2,4-dimethylaniline, 4-butylaniline, 2,5-diethoxyaniline, 2-chloroaniline, 3-chloroaniline, 4-chloroaniline, 2,5-dichloroaniline, 4-chloro-2-nitroaniline, 4-chloro-2-methylaniline, 3-chloro-2-methylaniline, 4-chloro-2-aminotoluene, 4-(p-tolylsulfonyl)aniline, 2-ethoxy-1-naphthylamine, 1-napthylamine, 2-naphthylamine, 4-benzoylamino-2-ethoxyaniline, 4-methylsulfonylaniline, 2,4-dichloroaniline-5-carboxylic acid, 2-aminobenzoic acid, 4-aminobenzoic acid, 3-aminobenzoic acid, 3-chloroaniline-6-carboxylic acid, aniline-2- or 3- or -4-sulfonic acid, aniline-2,5-disulfonic acid, aniline-2,4-disulfonic acid, aniline-3,5-disulfonic acid, 2-aminotoluene-4-sulfonic acid, 2-aminoanisole-4-sulfonic acid, 2-aminoanisole-5-sulfonic acid, 2-ethoxyaniline-5-sulfonic acid, 2-ethoxyaniline-4-sulfonic acid, 4-hydroxysulfonyl-2-aminobenzoic acid, 2,5-dimethoxyaniline-4-sulfonic acid, 2,4-dimethoxyaniline-5-sulfonic acid, 2-methoxy-5-methylaniline-4-sulfonic acid, 4-aminoanisole-3-sulfonic acid, 4-aminotoluene-3-sulfonic acid, 2-aminotoluene-5-sulfonic acid, 2-chloroaniline-4-sulfonic acid, 2-chloroaniline-5-sulfonic acid, 2-bromoaniline-4-sulfonic acid, 2,6-dichloroaniline-4-sulfonic acid, 2,6-dimethylaniline-3- or 4-sulfonic acid, 3-acetylamino-6-sulfonic acid, 4-acetylamino-2-hydroxysulfonylaniline, 1-aminonaphthalene-4-sulfonic acid, 1-aminonaphthalene-3-sulfonic acid, 1-aminonaphthalene-5-sulfonic acid, 1-aminonaphthalene-6-sulfonic acid, 1-aminonaphthalene-7-sulfonic acid, 1-aminonaphthalene-3,7-disulfonic acid, 1-aminonaphthalene-3,6,8-trisulfonic acis, 1-aminonaphthalene-4,6,8-trisulfonic acid, 2-naphthylamine-5-sulfonic acid or -6- or -8-sulfonic acid, 2-aminonaphthalene-3,6,8-trisulfonic acid, 2-aminonaphthalene-6,8-disulfonic acid, 2-aminonaphthalene-1,6-disulfonic acid, 2-aminonaphthalene-1-sulfonic acid, 2-aminonaphthalene-1,5-disulfonic acid, 2-aminonaphthalene-3,6-disulfonic acid, 2-aminonaphthalene-4,8-disulfonic acid, 2-aminophenol-4-sulfonic acid, 2-aminophenol-5-sulfonic acid, 3-aminophenol-6-sulfonic acid, 1-hydroxy-2-aminonaphthalene-5,8- or -4,6-disulfonic acid, 4-aminodiphenylamine, 4-amino-4'-methoxydiphenylamine, 4-amino-4'-methoxydiphenylamine-3-sulfonic acid, 4-(2'-methylphenylazo)-2-methylaniline, 4-aminoazobenzene, 4'-nitrophenylazo-1-aminonaphthalene, 4-(6'-hydroxysulfonylnaphthylazo)-1-aminonaphthalene, 4-(2', 5'-dihydroxysulfonylphenylazo)-1-aminonaphthalene, 4'-amino-3'-methyl-3-nitrobenzophenone, 4-aminobenzophenone, 4-(4'-aminophenylazo)benzenosulfonic acid, 4-(4'-amino-3'-methoxyphenylazo)benzenesulfonic acid and 2-ethoxy-1-naphthylamine-6-sulfonic acid.

Aromatic diamines which are suitable for use as di- or tetrazo components and which conform to the formula Xe or Xf are for example 1,3-diaminobenzene, 1,3-diaminobenzene-4-sulfonic acid, 1,4-diaminobenzene, 1,4-diaminobenzene-2-sulfonic acid, 1,4-diamino-2-methylbenzene, 1,4-diamino-2-methoxybenzene, 1,3-diamino-4-methylbenzene, 1,3-diaminobenzene-5-sulfonic acid, 1,3-diamino-5-methylbenzene, 1,6-diaminonaphthalene-4-sulfonic acid, 2,6-diaminonaphthalene-4,8-disulfonic acid, 3,3'-diaminodiphenyl sulfone, 4,4'-diaminodiphenyl sulfone, 4,4'-diaminostilbene, 2,2'-disulfonic acid, 2,7'-diaminodiphenyl sulfone, 2,7'-diamino-4,5-disulfodiphenyl sulfone, 4,4'-diaminobenzophenone, 4,4'-diamino-3,3'-dinitrobenzophenone, 3,3'-diamino-4,4-dichlorobenzenophenone, 4,4'- or 3,3'-diaminobiphenyl, 4,4'-diamino-3,3'-dichlorobiphenyl, 4,4'-diamino-3,3'-dimethoxy- or -3,3'-dimethyl- or -2,2'-dimethyl- or -2,2'-dichloro- or -3,3'-diethoxy-biphenyl, 4,4'-diamino-3,3'-dimethyl-6,6'-dinitrobiphenyl, 4,4'-diaminobiphenyl-2,2'- or -3,3'-disulfonic acid, 4,4'-diamino-3,3'-dimethyl- or -3,3'-dimethoxy or -2,2'-dimethoxybiphenyl-6,6'-disulfonic acid, 4,4'-diamino-2,2', 5,5'-tetrachlorobiphenyl, 4,4'-diamino-3,3'-dinitrobiphenyl, 4,4'-diamino-2,2'-dichloro-5,5'-dimethoxybiphenyl, 4,4'-diaminobiphenyl-2,2'- or - 3,3'-dicarboxylic acid, 4,4'-diamino-3,3'-dimethylbiphenyl-5,5'-disulfonic acid, 4,4'-diamino-2-nitrobiphenyl, 4,4'-diamino-3-ethoxy- or -3-hydroxysulfonylbiphenyl, 4,4'-diamino-3,3'-dimethylbiphenyl-5-sulfonic acid, 4,4'-diaminodiphenylmethane, 4,4'-diamino-3,3'-dimethyldiphenylmethane, 4,4'-diamino-2,2', 3,3'-tetramethyldiphenylmethane, 4,4'-diaminodiphenylethane, 4,4'-diaminostilbene and 4,4'-diaminodiphenylmethane-3,3'-dicarboxylic acid.

The radicals K of the coupling components can preferably be from the aniline, naphthalene, pyrazole, pyridine, pyrimidine, indole or acylacetarylide series.

Coupling components of the aniline and naphthalene series correspond for example to the compounds of the formula XIa–g

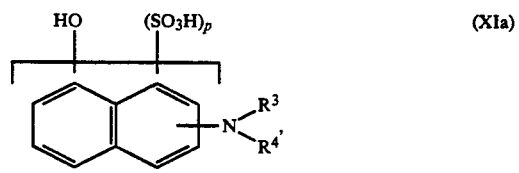

(XIa)

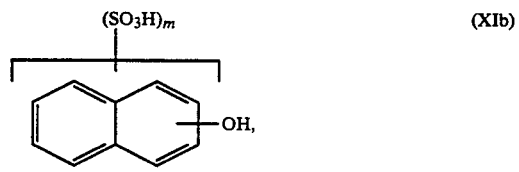

(XIb)

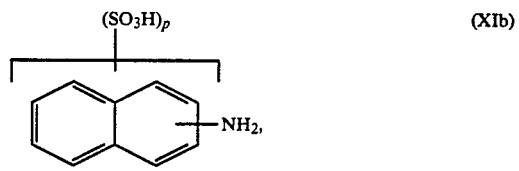

(XIb)

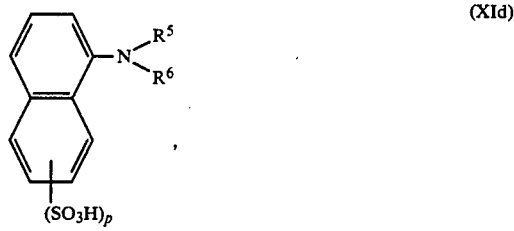

(XId)

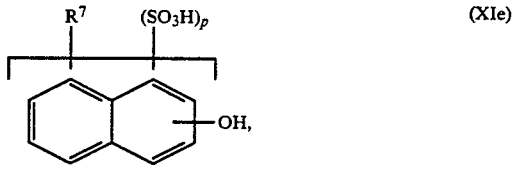

(XIe)

(XIf)

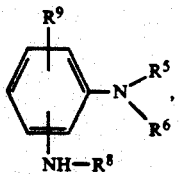

(XIg)

where $R^3$ is hydrogen or $C_1$-$C_4$-alkyl, $R^4$ is hydrogen, $C_1$-$C_4$-alkyl or phenyl which may be monosubstituted or disubstituted by $C_1$-$C_4$-alkyl, $C_1$-$C_4$-alkoxy, chlorine, bromine or hydroxysulfonyl, $R^5$ is hydrogen or $C_1$-$C_4$-alkyl which may be substituted by hydroxyl, cyano, carboxyl, hydroxysulfonyl, hydroxysulfonyloxy, methoxycarbonyl, ethoxycarbonyl, or acetoxy, $R^6$ is hydrogen, $C_1$-$C_4$-alkyl, which may be substituted by hydroxyl, cyano, carboxyl, hydroxysulfonyl, hydroxysulfonyloxy, methoxycarbonyl, ethoxycarbonyl or by acetoxy, benzyl or phenyl, which may be substituted by $C_1$-$C_4$-alkyl, $C_1$-$C_4$-alkoxy, chlorine or hydroxysulfonyl, $R^7$ is $C_1$-$C_6$-alkylureido, phenylureido, which may be substituted by chlorine, methyl, methoxy, nitro, hydroxysulfonyl or by carboxyl, $C_1$-$C_6$-alkanoylamino, cyclohexanoylamino, benzoylamine, which may be substituted by chlorine, methyl, methoxy, nitro, hydroxysulfonyl or by carboxyl, or hydroxyl, $R^8$ is hydrogen, $C_1$-$C_6$-alkyl, in particular $C_1$-$C_4$-alkyl, which may in either case be substituted by phenyl, $C_1$-$C_4$-alkoxy, hydroxyl, phenoxy or by $C_1$-$C_4$-alkanoyloxy, $C_5$-$C_7$-cycloalkyl, hydroxysulfonylphenyl, $C_1$-$C_4$-alkanoyl, carbamoyl, $C_1$-$C_4$-monoalkyl- or -dialkylcarbamoyl, phenylcarbamoyl or cyclohexylcarbamoyl, $R^9$ is hydrogen, methoxy, ethoxy, chlorine, bromine, acetylamino, amino, ureido, methylsulfonylamino, ethylsulfonylamino, dimethylaminosulfonylamino, methylamino, ethylamino, dimethylamino or diethylamino, $R^{10}$ is hydrogen, methyl, ethyl, methoxy, ethoxy, chlorine or bromine, and p and m are each as defined above.

Specific examples are o- or m-toluidine, o- or m-anisidine, cresidine, 2,5-dimethylaniline, 2,5-dimethoxyaniline, m-aminoacetanilide, 3-amino-4-methoxyacetanilide, 3-amino-4-methylacetanilide, m-aminophenylurea, N-methylaniline, N-methyl-m-toluidine, N-ethylaniline, N-ethyl-m-toluidine, N-(2-hydroxyethyl)aniline and N-(2-hydroxyethyl)-m-toluidine.

Naphtholsulfonic acids are for example 1-naphthol-3-sulfonic acid, 1-naphthol-4-sulfonic acid, 1-naphthol-5-sulfonic acid, 1-naphthol-8-sulfonic acid, 1-naphthol-3,6-disulfonic acid, 1-naphthol-3,8-disulfonic acid, 2-naphthol-8-sulfonic acid, 2-naphthol-6-sulfonic acid, 2-naphthol-7-sulfonic acid, 2-naphthol-8-sulfonic acid, 2-naphthol-3,6-disulfonic acid, 2-naphthol-6,8-disulfonic acid, 2-naphthol-3,6,8-trisulfonic acid, 1,8-dihydroxynaphthalene- 3,6-disulfonic acid, 2,6-dihydroxynaphthalene-8-sulfonic acid and 2,8-dihydroxynaphthalene-6-sulfonic acid.

It is also possible to mention for example 1-naphthylamine, N-phenyl-1-naphthylamine, N-ethyl-1-naphthylamine, N-phenyl-2-naphthylamine, 1,5-naphthylenediamine, 1,8-naphthylenediamine, 1-naphthol, 2-naphthol, 1,5-dihydroxynaphthalene, 1,6-dihydroxynaphthalene, 1,7-dihydroxynaphthalene, 2,7-dihydroxynaphthalene, 2-hydroxynaphthalene-3-N-phenylcarboxamide, 2-hydroxynaphthalene-3-N-(2'-methoxyphenyl)carboxamide and 2-hydroxynaphthalene-3-N-(2', 5'-dimethoxyphenyl)carboxamide.

Aminoaphthalenesuflonic acids are for example 1-naphtylamine-6-sulfonic acid, 1-naphthylamine-7-sulfonic acid, 1-naphthylamine-8-sulfonic acid, 2-naphthylamine-3,6-disulfonic acid, 2-naphthylamine-5,7-disulfonic acid and 2-naphthylamine-6,8-disulfonic acid.

Suitable aminonaphtholsulfonic acids are for example 1-amino-5-hydroxynaphthalene-7-sulfonic acid, 1-amino-8-hydroxynaphthalene-4-sulfonic acid, 1-amino-8-hydroxynaphthalene-2,4-disulfonic acid, 1-amino-8-hydroxynaphthalene-3,6-disulfonic acid, 1-amino-8-hydroxynaphthalene-4,6-disulfonic acid, 2-amino-5-hydroxynaphthalene-7-sulfonic acid, 2-amino-8-hydroxynaphthalene-6-sulfonic acid, 2-amino-8-hydroxynaphthalene-3,6-disulfonic acid, 2-amino-5-hydroxynaphthalene-1,7-disulfonic acid, 1-acetylamino-8-hydroxynaphthalene-3,6-disulfonic acid, 1-benzoylamino-8-hydroxynaphthalene-3,6-disulfonic acid, 1-acetylamine-8-hydroxynaphthalene-4,6-disulfonic acid, 1-benzoylamino-8-hydroxynaphthalene-4,6-disulfonic acid, 1-acetylamino-5-hydroxynaphthalene-7-sulfonic acid, 2-methylamino-8-hydroxynaphthalene-6-sulfonic acid, 2-methylamino-8-hydroxynaphthalene-6-sulfonic acid and 2-(3'- or 4'-hydroxysulfonylphenyl)amino-8-hydroxynaphthalene-6-sulfonic acid.

Of particular importance are coupling components which possess sulfo and/or carboxyl groups and which couple ortho or para to a hydroxyl and/or amino group.

Examples of such coupling components are 2-acetylamino-5-hydroxynaphthalene-7-sulfonic acid, 2-acetylamino-8-hydroxynaphthalene-6-sulfonic acid, 1-acetylamino-8-hydroxynaphthalene-3,6-disulfonic acid, 1-benzoylamino-8-hydroxynaphthalene-3,6-disulfonic acid, 1-acetylamino-8-hydroxynaphthalene-4,6-disulfonic acid and 1-benzoylamino-8-hydroxynaphthalene-4,6-disulfonic acid.

Coupling components of further series are for example: pyrazolones, aminopyrazoles, 2,6-diaminopyridines, pyridones, hydroxypyrimidines, aminopyrimidines, indoles and acetoacetarylides.

Coupling components of this series conform for example to the formula XIIa-f

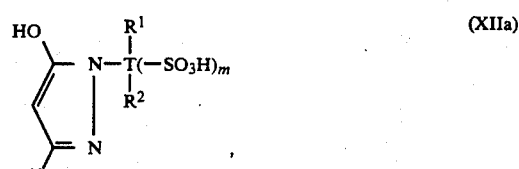

(XIIa)

(XIIb)

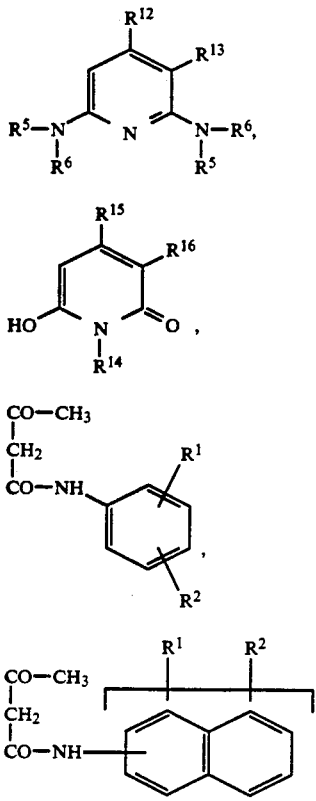

where
T is a benzene or naphthalene nucleus,
$T^1$ is $C_1$–$C_4$-alkyl, cyclohexyl, benzyl or phenyl which is monosubstituted or polysubstituted by fluorine, chlorine, bromine, methyl, methoxy, nitro, hydroxysulfonyl, carboxyl, acetyl, acetylamino, methylsulfonyl, sulfamoyl or carbamoyl,
$R^{11}$ is methyl, carboxyl, methoxycarbonyl, ethoxycarbonyl or phenyl,
$R^{12}$ is hydrogen of $C_1$–$C_4$-alkyl which may be substituted by methoxy, ethoxy or cyano,
$R^{13}$ is hydrogen, methyl, hydroxysulfonylmethyl, hydroxysulfonyl, cyano or carbamoyl,
$R^{14}$ is hydrogen, $C_1$–$C_4$-alkyl, which may be substituted by phenyl, hydroxysulfonylphenyl, hydroxyl, amino, methoxy, ethoxy, carboxyl, hydroxysulfonyl, acetylamino, benzoylamino or by cyano, cyclohexyl, phenyl, which may be substituted by carboxyl, hydroxysulfonyl, benzoylamino, acetylamino, methyl, methoxy, cyano or by chlorine, or amino which is substituted by phenyl, $C_1$–$C_4$-alkyl, acetyl or benzoyl,
$R^{15}$ is $C_1$–$C_4$-alkyl, phenyl, hydroxyl, cyano, acetyl, benzoyl, carboxyl, methoxycarbonyl, carbamoyl or hydroxysulfonylmethyl,
$R^{16}$ is hydrogen, chlorine, bromine, acetylamino, amino, nitro, hydroxysulfonyl, sulfamoyl, methylsulfonyl, phenylsulfonyl, carboxyl, methoxycarbonyl, acetyl, benzoyl, carbamoyl, cyano or hydroxysulfonylmethyl, and $R^1$, $R^2$, $R^5$, $R^6$ and m are each as defined above.

Suitable pyrazolone coupling components are for example 3-methyl-, 3-carboxy- or 3-($C_1$–$C_4$-alkoxycarbonyl)pyrazol-5-ones which may carry in the 1-position hydrogen, unsubstituted or methyl-, ethyl-, fluorine- or chlorine- or bromine-, trifluoromethyl-, methoxy-, ethoxy-, cyano-, phenoxy-, phenylsulfonyl-, methylsulfonyl-, hydroxysulfonyl-, benzoyl-, acetyl-, acetylamino-, nitro-, hydroxyl-, carboxyl, carbamoyl- or sulfamoyl-substituted phenyl or hydroxysulfonyl-substituted 1- or 2-naphthyl. Examples are 1-phenyl-, 1-(2'-chlorophenyl)-, 1-(2'-methoxyphenyl)-, 1-(2'-methylphenyl)-, 1-(1', 5'-dichlorophenyl)-, 1-(2', 6'-dichlorophenyl)-, 1-(2'-methyl-6'-chlorophenyl)-, 1-(2'-methoxy-5'-methylphenyl)-, 1-(2'-chloro-5'-hydroxysulfonylphenyl)-, 1-(2'-methoxy-5'-hydroxysulfonylphenyl)-, 1-(2', 5'-dichloro-4'-hydroxysulfonylphenyl)-, 1-(2',5'-dihydroxysulfonylphenyl)-, 1-(2-carboxyphenyl)-, 1-(3'-hydroxysulfonylphenyl)-, 1-(4'-hydroxysulfonoylphenyl)-or 1-(3'-sulfamoylphenyl)-3-carboxylpyrazol-5-one, 1-(3'-or 4'-hydroxysulfonylphenyl)-, 1-(2'-chlorophenyl)-, 1-(2'-chloro-4'- or -5'hydroxysulfonylphenyl)-, 1-(2'-methyl-4'-hydroxysulfonylphenyl)-, 1-(2',5'-dichlorophenyl)-, 1-(4', 8'-dihydroxysulfonyl-8-naphthyl)- or 1-(6'-hydroxysulfonyl-1-naphthyl)-3-methyl-pyrazol-5-one, ethyl 1-phenylpyrazol-5-one-3-carboxylate, ethyl pyrazol-5-one-3-carboxylate and pyrazol-5-one-3-carboxylic acid.

Other pyrazole coupling components are for example 1-methyl-, 1-ethyl-, 1-propyl-, 1-butyl-, 1-cyclohexyl-, 1-benzyl- or 1-phenyl-5-aminopyrazole, 1-(4'-chlorophenyl)- or 1-(4'-methylphenyl)-5-aminopyrazole and 1-phenyl-3-methyl-5-aminopyrazole.

Acetoacetanilides are in particular acetoacetanilide itself and its derivatives with monosubstitution or polysubstitution in the phenyl nucleus by chlorine, methyl, ethyl, methoxy, ethoxy, acetylamino, hydroxysulfonyl, carboxyl, carbamoyl or sulfamoyl.

Pyridine-derived coupling components are for example the derivatives described in DE-A-2 260 827.

Suitable pyrimidine coupling components are for example the compounds listed in DE-A-2 202 820, DE-A-2 308 663 or DE-A-3 119 349. It is also possible to use barbituric acid and its N-substitution products. Suitable N-substituents here are in particular $C_1$–$C_4$-alkyl and substituted or unsubstituted phenyl.

Suitable indole coupling components are for example 2-methylindole, 2-phenylindole, 2-phenylindole-5-sulfonic acid, 1-methyl-2-phenylindole, and 1-(2'-hydroxyethyl)-, 1-(2'-carboxyethyl)- and 1-(2'-carbamoylethyl)-2-methylindole and -2-phenylindole.

Suitable pyridone coupling components are for example 1-methyl-2-hydroxy-4-methyl-5-carbamoylpyrid-6-one, 1-(2'-hydroxyethyl)-2-hydroxy-4-methyl-5-carbamoylpyrid-6-one, 1-phenyl-2-hydroxy-4-methyl-5-carbamoylpyrid- 6-one, 1-ethyl-2-hydroxy-4-methyl-5-cyanopyrid-6-one, 1-ethyl-2-hydroxy-4-hydroxysulfonylmethyl-5-carbamoylpyrid-6-one, 1-ethyl-2-hydroxy-4-methyl-5-hydroxysulfonylmethylpyrid-6-one, 1-methyl-2-hydroxy-4-methyl-5-cyanopyrid-6-one, 1-methyl-2-hydroxy-5-acetylpyrid-6-one, 1,4-dimethyl-2-hydroxy-5-cyanopyrid-6-one, 1,4-dimethyl-5-carbamoylpyrid-6-one, 2,6-dihydroxy-4-ethyl-5-cyanopyridine, 2,6-dihydroxy-4-ethyl-5-carbamoylpyridine, 1-ethyl-2-hydroxy-4-methyl-5-hydroxysulfonylmethylpyrid-6-one, 1-methyl-2-hydroxy-4-methyl-5-methylsulfonylpyrid-6-one and 1-carboxymethyl-2-hydroxy-4-ethyl-5-phenylsulfonylpyrid-6-one.

Instead of azo dye radicals the dyes of the formula I may also contain appropriate metal complex dye radicals. Suitable complexing metals here are in particular copper, cobalt, chromium, nickel and iron, of which copper, cobalt and chromium are preferred.

In such metal complex dye radicals, the metallized groups are each preferably ortho-disposed to the azo group, for example in the from of o,o'-dihydroxy-, o-hydroxy-o'-carboxy-, o-carboxy-o'-amino- or o-hydroxy-o'-amino-azo groups.

The radical B but also, if E is C—Cl or n is 0 and $Z^1$ is the radical of the formula

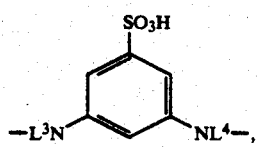

where $L^3$ and $L^4$ are each as defined above, the radical A can also be derived for example from a formazan dye, in particular a copper formazan dye.

Copper formazans are known per se and described for example in K. Venkataraman, The Chemistry of Synthetic Dyes, vol. III, Academic Press, New York, London, 1970.

Partiuclar preference is give to reactive dyes of the formula I where A and/or B are each a radical of the formula XIII

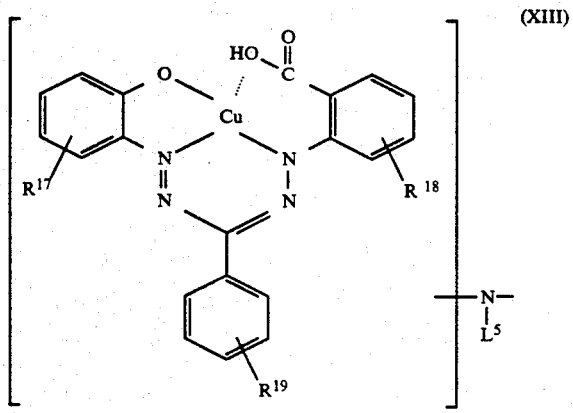

where
$R^{17}$, $R^{18}$ and $R^{19}$ are identical or different and each is independently of the others hydrogen or hydroxysulfonyl and
$L^5$ is as defined above.

A method for preparing the formazans underlying these dyes is described for example in earlier Patent Application EP-A-315 046.

The present invention also encompasses the salts of those reactive dyes of the formula I which have one or more sulfo and/or carboyxl groups.

Suitable salts of this type are metal or ammonium salts. Metal salts are in particular the lithium, sodium and potassium salts. Ammonium salts for the purposes of the present invention are those salts which have either unsubstituted or substituted ammonium cations. Substituted ammonium cations are for example monoalkylammonium, dialkylammonium, trialkylammonium, tetraalkylammonium and benzyltrialkylammonium cations and those cations which are derived from nitrogen-containing five-or six-membered saturated heterocyles, such as pyrrolidinium, piperidinium, morpholinium, piperazinium or N-alkylpiperazinium cations or their N-monoalkyl- or N,N-dialkyl-substituted products. Alkyl is in this context in general straight-chain or branched $C_1$-$C_{20}$-alkyl which may be substituted by hydroxyl and/or interrupted by oxygen.

The novel reactive dyes of the formula I can be obtained by methods known per se.

In what follows, various methods are mentioned by way of example.

a) A reaction of the dye of the formula XIV

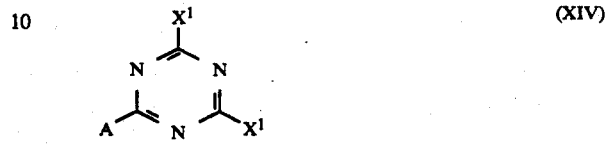

where A and $X^1$ are each as defined above, with the compound of the formula XV $Z^1H_2$ (XV)

where $Z^1$ is as defined above, in a molar ratio of 2:1 to form a reactive dye of the formula XVI

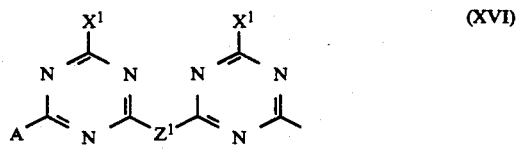

where A, $X^1$ and $Z^1$ are each as defined above.

b) A reaction as per method a) but in the molar ratio of 1:1 and a subsequent reaction with the compound of the formula XVII

where B, E and $X^3$ are each as defined above and Hal is fluorine or chlorine, to form a dye of the formula XVIII

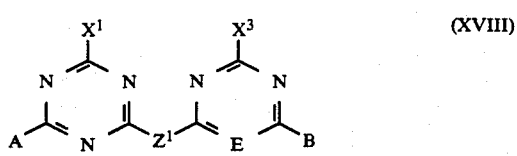

where A, B, E, $X^1$, $X^3$ and $Z^1$ are each as defined above.

c) A reaction of compound XV ($Z^1H_2$) first with cyanuric fluoride or chloride in the molar ratio of 1:2 and then with a compound of the formula IXX or XX

AH (IXX)

$B^1$H (XX)

where A is as defined above and $B^1$ has the same meaning as B with the exception of fluorine, chlorine or methyl.

d) A reaction of dye XIV first with compound XV in the molar ratio of 1:1 and then further reaction with cyanuric fluoride or chloride to form a dye of the formula XXI

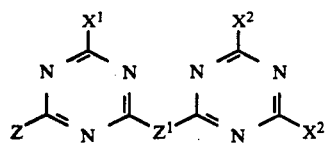

where A, $X^1$, $X^2$ and $Z^1$ are each as defined above. This dye may then be further reacted by the following scheme:

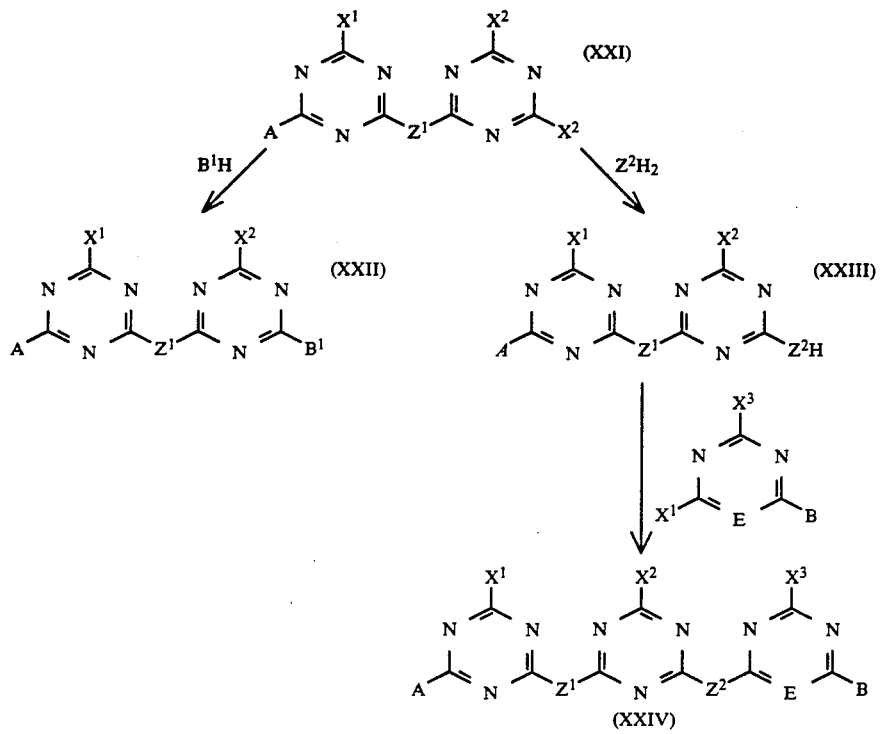

Further directions concerning preparation are revealed in the Examples.

The novel reactive dyes of the formula I are suitable for dyeing or printing hydroxyl- or nitrogen-containing organic substrates. Such substrates are for example leather or fiber material which contains predominantly natural or synthetic polyamides or natural or regenerated cellulose. The novel dyes are particularly suitable for dyeing and printing textile material based on cotton. Used for this purpose they are advantageously applied by the exhaust method.

Dyes according to the present invention are readily soluble and have a very high fastness, particular a high wet fastness. The color buildup in medium to deep dyeings is particularly good.

The Examples which follow further illustrate the invention.

EXAMPLE 1 a) Preparation of the Dichlorotriazine Dye 26.5 g (0.1 mol) of the primary condensation product of cyanuric chloride and 1,3-phenylenediamine-4-sulfonic acid were diazotized in 500 ml of ice-cold hydrochloric acid. 24.7 g (0.1 mol) of 1-ethyl-6-hydroxy-4-methyl-3-hydroxysulfonylmethylpyrid-2-one were added, and the coupling was completed at pH 6–7 and 5°–10° C. by adding sodium bicarbonate.

b) Preparation of the Monochlorotriazine Dye

Thereafter 20.2 g (0.05 mol) of the sodium salt of 1-amino-3-methylaminobenzene-4-sulfonic acid were dissolved in 200 ml of water at pH 3–4 and 30°–35° C. by adding 0.01 mol of trisodium phosphate and sodium hydroxide solution. 0.05 mol of the dichlorotriazine dye prepared under a) (synthesis solution) was added over 1 hour during which the pH was maintained at 3–4 by adding sodium bicarbonate. The resulting dye conforms to the formula

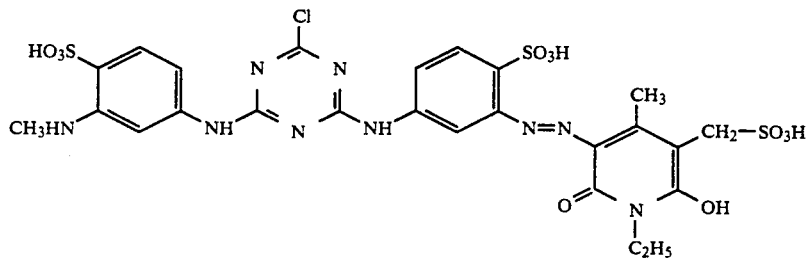

c) 0.05 mol of the monochlorotriazine dye prepared under b) was introduced at pH 6–7 and 50°–60° C. and 0.05 mol of the dichlorotriazine dye prepared under a) was added dropwise over 1 hour during which the pH was maintained at 6–7 by adding sodium bicarbonate.

When neither the dichlorotriazine dye 1a) nor the monochlorotriazine dye 1b) were any longer detectable by thin layer chromotography, the condensation had ended. The synthesis solution was spray dried. The resulting dye of the formula

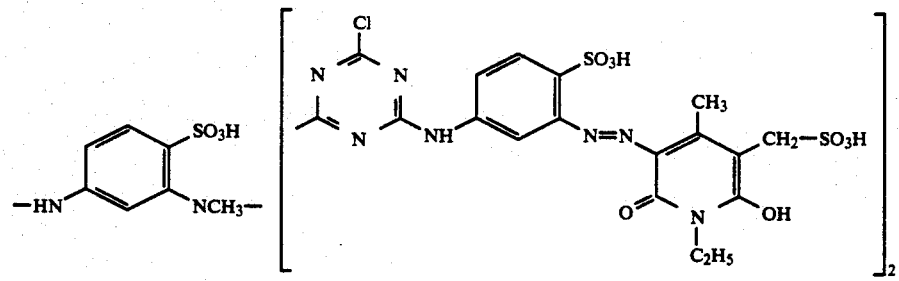

dyes cotton in a brilliant greenish yellow shade having high light and wet fastness properties.

A dye of the same constitution as Example 1c) is obtained on condensing 0.05 mol of 1-amino-3-methylaminobenzene-4-sulfonic acid and 0.1 mol of dichlorotriazine dye 1a) at 50°–60° C. and pH 6–7.

The same method was used to obtain the dyes listed in Table 1.

TABLE 1

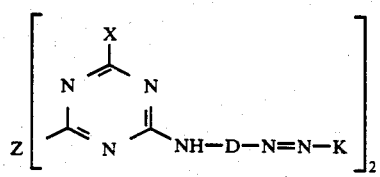

| Example No. | Z | X | D | K | Hue on cotton |
|---|---|---|---|---|---|
| 2 | SO₃H, —NCH₃—, —HN (benzene) | Cl | SO₃H, HO₃S (benzene) | CH₃, CH₃, O, N-CH₃, OH (pyridone) | greenish yellow |
| 3 | SO₃H, —NCH₃—, —HN (benzene) | Cl | SO₃H (benzene) | CO₂H, CH₃, HO, N=N, 2-Cl-phenyl (pyrazolone) | greenish yellow |
| 4 | SO₃H, —NCH₃—, —HN (benzene) | Cl | SO₃H (benzene) | OH, SO₃H, SO₃H (naphthalene) | reddish orange |
| 5 | SO₃H, —NCH₃—, —HN (benzene) | Cl | SO₃H (benzene) | OH, CH₃, HO₃S, SO₃H (naphthalene) | orange |

TABLE 1-continued

| Example No. | Z | X | D | K | Hue on cotton |
|---|---|---|---|---|---|
| 6 | (SO₃H, NCH₃, —HN— substituted benzene) | Cl | (SO₃H substituted benzene) | 1-hydroxy-4-sulfo-naphthyl (with CH₃) | yellowish red |
| 7 | (SO₃H, —HN—, —NH— substituted benzene) | Cl | (SO₃H, HO₃S substituted benzene) | pyridone (CH₃, CONH₂, OH, N–C₂H₅) | greenish yellow |
| 8 | (SO₃H, NCH₃, —HN— substituted benzene) | Cl | (SO₃H substituted benzene) | OH, NH—CO—C₂H₅, HO₃S, SO₃H naphthyl | red |
| 9 | (SO₃H, —HN—, —NH— substituted benzene) | Cl | (SO₃H substituted benzene) | OH, NH—CO—C₆H₅, HO₃S, SO₃H naphthyl | red |
| 10 | (SO₃H, —HN—, —NH— substituted benzene) | Cl | (SO₃H substituted benzene) | OH, NHCOCH₃, HO₃S naphthyl | orange |

EXAMPLE 11 a) 59.5 g (0.1 mol) of the known dye of formula were dissolved in 500 ml of ice-water at pH 5–6. A suspension of 14.9 g (0.1 mol) of cyanuric chloride in ice-water was then added over 30 minutes during which the pH was maintained at 5–6, by the addition of sodium bicarbonate, and the temperature at 0°–5° C. The resulting primary condensation product conforms to the formula

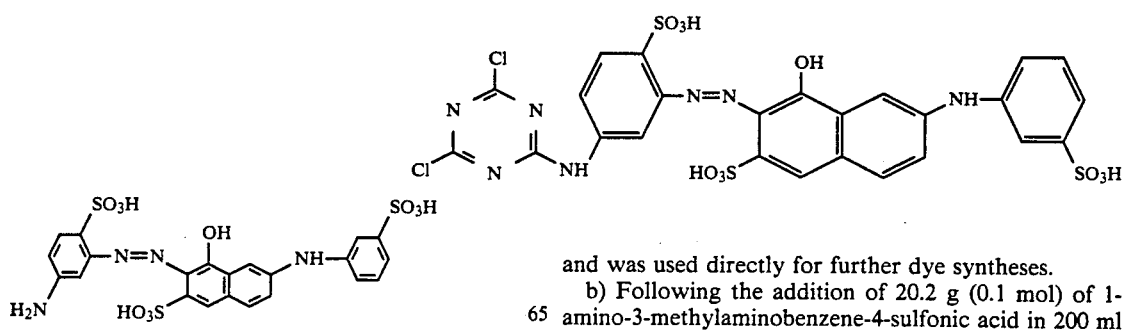

and was used directly for further dye syntheses.

b) Following the addition of 20.2 g (0.1 mol) of 1-amino-3-methylaminobenzene-4-sulfonic acid in 200 ml of water, a second condensation was carried out at 30°–35° C. at pH 5–6. The resulting dye conforms to the formula

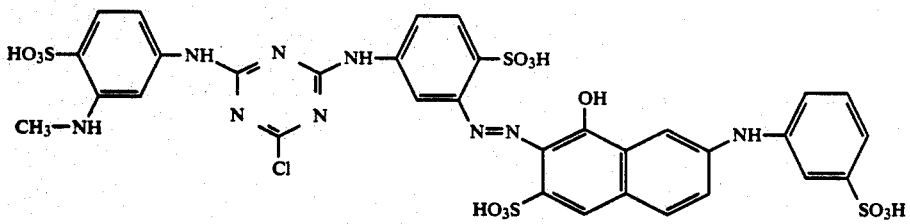

c) 90.9 g (0.1 mol) of the aqueous solution of the monochlorotriazine dye of Example 11a) were admixed once more with 14.9 g (0.11 mol) of trichlorotriazine in 50 ml of toluene at 5°–10° C. and pH of 6–7. After the reaction had ended, 0.1 mol of aniline-3-sulfonic acid was added and the mixture was stirred at 25°–30° C. and pH 6–7 for 2 hours. Sodium chloride was added to salt out a dark eye powder which dyes cotton in fast brown shades. It conforms to the formula

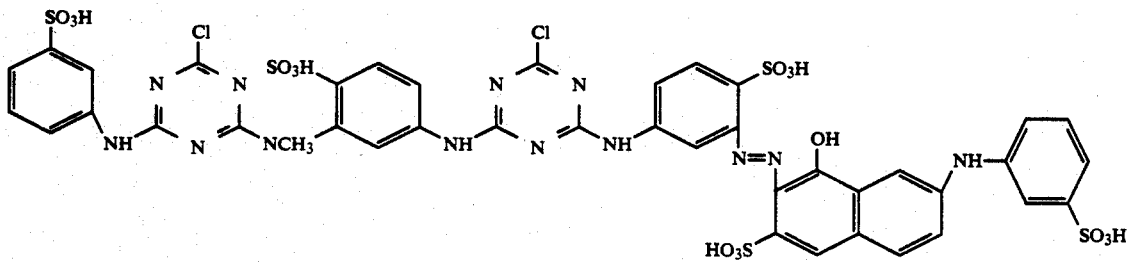

The same method was used to obtain the dyes listed in Table 2.

TABLE 2

| Example No. | L | X | R | Y | D | K | Hue on cotton |
|---|---|---|---|---|---|---|---|
| 12 | H | Cl | CH₃ | Cl | (SO₃H-substituted dimethylphenyl) | (pyridone with CH₃, CH₂SO₃H, OH, N-C₂H₅) | greenish yellow |
| 13 | HO₃S—C₆H₄—F (4-fluoro-sulfophenyl) | F | CH₃ | Cl | (SO₃H-substituted dimethylphenyl) | (pyridone with CH₃, OH, N-CH₃) | greenish yellow |
| 14 | H | Cl | CH₃ | Cl | (SO₃H-substituted dimethylphenyl) | (naphthol with HO, NH–COC₂H₅, HO₃S, SO₃H) | red |
| 15 | 3-sulfophenyl (HO₃S—C₆H₄—) | Cl | CH₃ | Cl | (SO₃H-substituted dimethylphenyl) | (naphthol with HO, HO₃S, SO₃H) | orange |

TABLE 2-continued

![structure]

| Example No. | L | X | R | Y | D | K | Hue on cotton |
|---|---|---|---|---|---|---|---|
| 16 | H | Cl | CH₃ | Cl | (benzene with HO₃S, HO₃S, CH₃) | (pyridone with CH₃, OH, C₂H₅) | greenish yellow |

EXAMPLE 17

53.2 g (0.1 mol) of 4-(3',6',8'-trihydroxysulfonyl-naphth-2-ylazo)-3-ureidoaniline were dissolved in 800 ml of water at pH 7 and admixed with a suspension of 18.5 g (0.1 mol) of cyanuric chloride in water at 5°–10° C. and pH 6–7. Thereafter 9.4 g (0.05 mol) of 1,3-phenylenediamine-5-sulfonic acid were added, and the mixture was stirred at 40° C. for 2 hours during which the pH was maintained at 6–7 by adding sodium bicarbonate. The resulting monochlorotriazine dye conforms to the formula

EXAMPLE 18

53.2 g (0.1 mol) of 4-(3',6',8'-trihydroxysulfonyl-naphth-2-ylazo)-3-ureidoaniline were dissolved in 800 ml of water at pH 7 and admixed with a solution of 13.5 g (0.1 mol) of cyanuric fluoride in 100 ml of toluene at 0°–3° C. and pH 6–7 over 30 minutes. Once free amino groups were no longer detectable, a neutral aqueous solution of 10.1 g (0.05 mol) of 1-amino-3-methylamino-benzene-4-sulfonic acid was added, and the mixture was stirred at pH 6–7 and 25°–30° C. for a further 2 hours. The resulting dye conforms to the formula

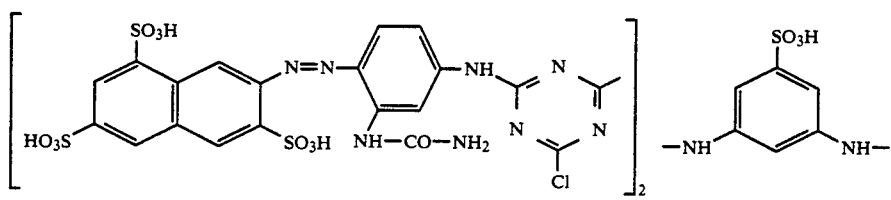

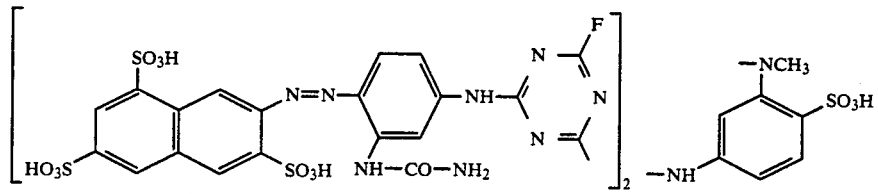

and was salted out by adding potassium chloride. It dyes cotton in reddish yellow shades of good light and wet fastness.

and dyes cotton in reddish yellow shades of good light and wet fastness properties.

The same method was used to obtain the dyes listed in Table 3.

TABLE 3

| Example No. | D | K | X | Z | Hue on cotton |
|---|---|---|---|---|---|
| 19 | 1-SO3H, 7-CH3, 3-HO3S naphthalene | phenyl with NH–CONH2 (ortho), NH– | Cl | benzene with SO3H, NCH3–, –NH | reddish yellow |
| 20 | 1-SO3H, 7-CH3, 3-HO3S naphthalene | phenyl with OCH3, CH3, NH– | Cl | benzene with SO3H, NCH3–, –NH | reddish yellow |
| 21 | 2-SO3H, 4-HO3S toluene | phenyl with NH–COC6H5, NH– | Cl | benzene with SO3H, –NH, NH– | reddish yellow |
| 22 | 1-SO3H, 7-CH3, 3-HO3S naphthalene | phenyl with NH–CO–NH2, NH– | Cl | –HN, –NH benzene with SO2–NH–C2H4–SO3H | reddish yellow |
| 23 | 1-SO3H, 7-CH3, 3-HO3S naphthalene | phenyl with NH–CO–NH2, NH– | F | benzene with SO3H, –NH, NH– | reddish yellow |

EXAMPLE 24

20.2 g (0.1 mol) of 1-amino-3-methylaminobenzene-4-sulfonic acid were dissolved in 200 ml of water at pH 7, and the solution was heated to 40° C. 54.5 g (0.1 mol) of the condensation product of 4-(3',6',8'-trihydroxysulfonyulnaphth-2-ylazo)-3-ureidoaniline and cyanuric chloride were added. The batch was maintained at 40° C. for 3 hours and at pH 6–7 by adding sodium bicarbonate. After the reaction had ended, the batch was cooled to 10° C. and admixed with a suspension of 9.2 g (0.05 mol) of cyanuric chloride in 200 ml of ice-water. The batch was maintained at 10°–15° C. and pH 6–7 (NaHCO3) for 1 hour. The solution was filtered and stirred at 50°–60° C. and pH 6–7 for 2 hours. The resultant dye was precipitated with 400 g of potassium chloride, filtered off with suction and dried under reduced pressure. It conforms to the formula

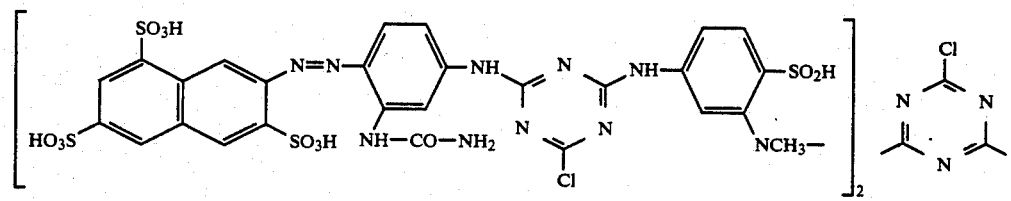

and dyes cotton in reddish yellow shades having good light and wet fastness properties.

EXAMPLE 25

20.2 g (0.1 mol) of 1-amino-3-methylaminobenzene-4-sulfonic acid, dissolved in 200 ml of ice-water, were reacted with a suspension of 18.4 g (0.1 mol) of cyanuric chloride in 200 ml of ice-water at pH 3–4 and 0°–5° C. 17.3 g (0.1 mol) of aniline-3-sulfonic acid were added, and a second condensation was carried out at 30°-35° C. and pH 6-7 in the course of 3 hours. A further 18.4 g (0.1 mol) of cyanuric chloride were then added, and the mixture was maintained at pH 6-7 and 5°-10° C. for 2 hours. After the addition of 54.5 g (0.1 mol) of 4-(3',6',8'-trihydroxysulfonylnaphth-2-ylazo)-3-ureidonaline, dissolved in 1 l of water at pH 7, the batch was maintained at 40° C. and pH 6-7 for 2 hours. The dye obtained was salted out with sodium chloride. It conforms to the formula and was reacted at 30°-35° C. with an aqueous solution of 53.2 g (0.1 mol) of 4-(3',6',8'-trihydroxysulfonyl-naphth-2-ylazo)-3-ureidoaniline at pH 6-7.

The resulting dye of the formula

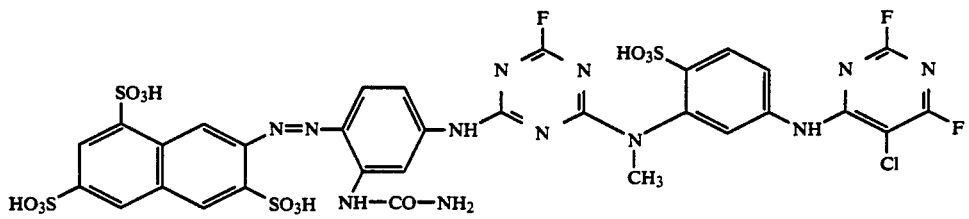

dyes cotton in reddish yellow shades having good light and wet fastness properties

EXAMPLE 27

38.6 g (0.1 mol) of the known dye of the formula

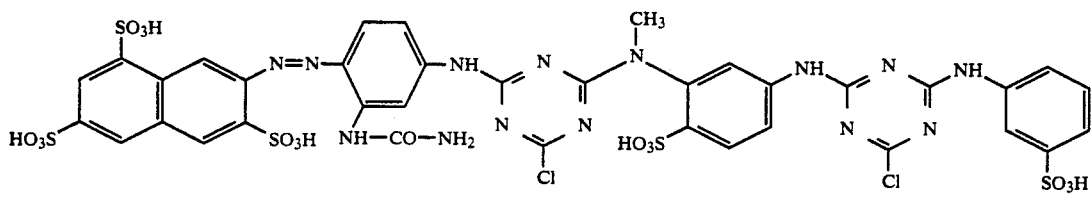

and dyes cotton in reddish yellow shades having good light and wet fastness properties.

EXAMPLE 26

20.2 g (0.1 mol) of 1-amino-3-methylaminobenzene-4-sulfonic acid were dissolved in 400 ml of water under neutral conditions, and the solution was admixed with 20.2 g (0.12 mol) of 2,4,6-trifluoro-5-chloropyrimidine at 10° C. over 2 hours. The mixture was subsequently stirred for 2 hours, brought to pH 7 by adding sodium bicarbonate and admixed with 14.9 g (0.11 mol) of cyanuric fluoride added drop wise at 0° C. over 5 minutes. The pH was maintained at 7 by adding sodium bicarbonate.

The solution obtained mainly contained the condensation product of the formula

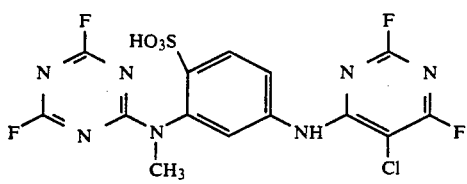

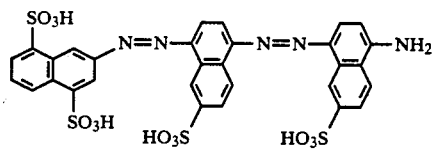

were dissolved in 400 ml of water at pH 7 and 10°-15° C. and reacted with 18.5 g (0.1 mol) of cyanuric chloride. When free amino groups were no longer detectable, 20.2 g (0.1 mol) of 1-amino-3-methylaminobenzene-4-sulfonic acid were added, and the batch was maintained at pH 3-4 and 40° C. for 2 hours. The resulting monochlorotriazine dye was acylated once more with 18.5 g (0.1 mol) of cyanuric chloride at pH 6-7 and 10-°15° C. After the addition of 17.3 g (0.1 mol) of aniline-3-sulfonic acid, the batch was stirred at pH 6-7 and 40° C. for a further 2 hours. The resulting dye of the formula

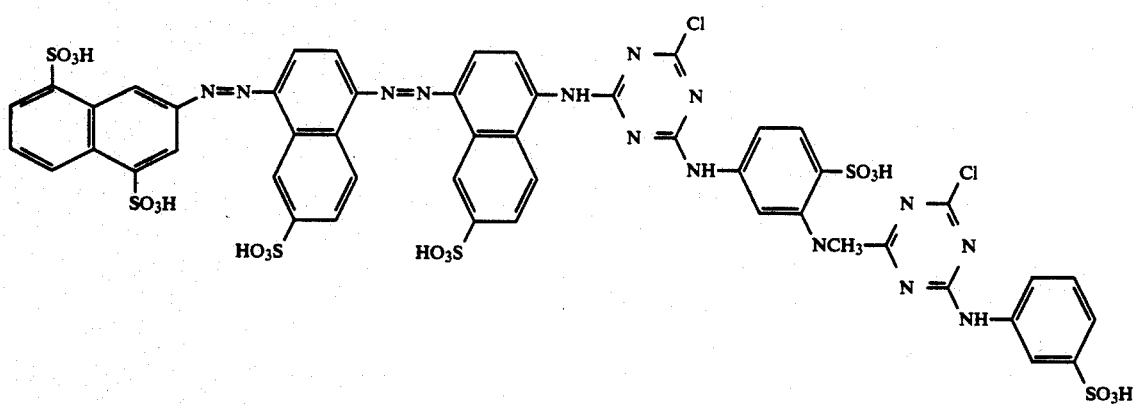

was precipitated by adding potassium chloride. It dyes cotton in reddish brown shades having good light and wet fastness properties.

The same method was used to obtain the dyes listed in Table 4.

TABLE 4

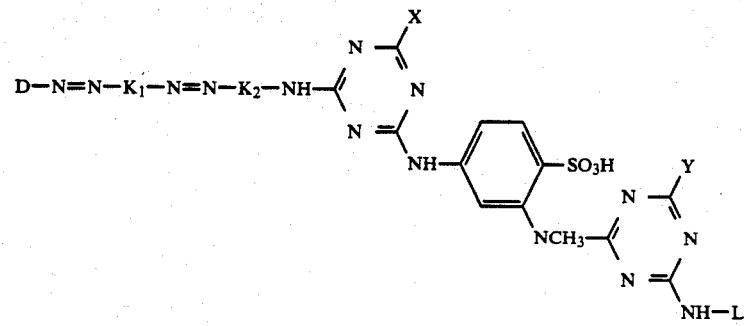

| Example No. | D | $K_1$ | $K_2$ | X | Y | L | Hue on cotton |
|---|---|---|---|---|---|---|---|
| 28 | naphthalene with SO$_3$H, HO$_3$S, SO$_3$H | naphthalene | naphthalene with HO$_3$S | Cl | Cl | phenyl-SO$_3$H | reddish brown |
| 29 | naphthalene with SO$_3$H, HO$_3$S, SO$_3$H | naphthalene | benzene with CH$_3$, H$_3$C | F | Cl | phenyl-SO$_3$H | yellowish brown |
| 30 | benzene with SO$_3$H, HO$_3$S | benzene with H$_3$C | naphthalene with SO$_3$H | Cl | Cl | H | yellowish orange |

TABLE 4-continued

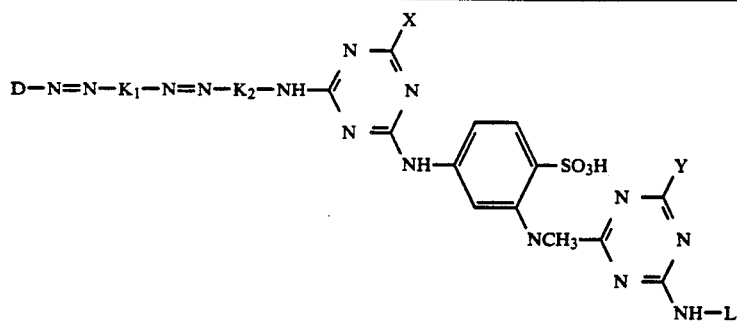

| Example No. | D | $K_1$ | $K_2$ | X | Y | L | Hue on cotton |
|---|---|---|---|---|---|---|---|
| 31 | (SO₃H, CH₃, HO₃S-benzene) | (naphthalene-HO₃S) | (naphthalene-SO₃H) | Cl | Cl | H | reddish brown |

EXAMPLE 32

17.3 g (0.1 mol) of aniline-4-sulfonic acid were diazotized in 400 ml of water under hydrochloric acid conditions and stirred together with 31.9 g (0.1 mol) of 1-amino-8-hydroxynaphthalene-3,6-disulfonic acid at pH 1.5 until the coupling had ended. After the addition of 33.6 g (0.1 mol) of the diazonium product, prepared in hydrochloric acid, of 3-amino-1-(4,6-dichloro-1,3,5-triazin-2-yl-amino)benzene-4-sulfonic acid in 500 ml of water, the batch was maintained at pH 6–6.5 at 15° C. for 1 hour. After the second coupling had ended, 20.2 g (0.1 mol) of 1-amino-3-methylaminobenze-4-sulfonic acid were added and the batch was stirred at 40° C. and pH 3–4 for 2 hours. 18.5 g (0.1 mol) of cyanuric chloride were added, and the batch was maintained at 5–°10° C. and pH 6–7 for 2 hours. This was followed by a reaction at pH 9 and 40° C. with 27.2 g (0.4 mol) of 25% strength by weight aqueous NH₃ solution. The resulting dye conforms to the formula:

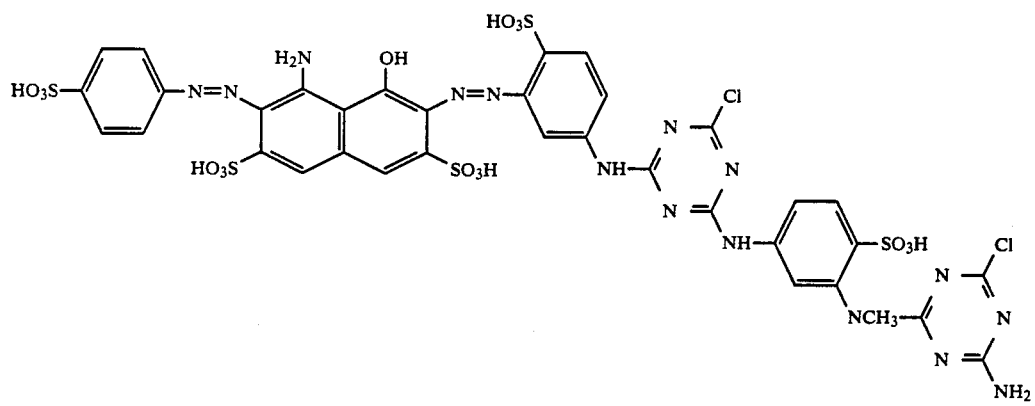

and dyes cotton in navy shades having good light and wet fastness properties.

The same method was used to obtain the dyes listed in Table 5.

TABLE 5

[Structure: naphthalene core with $H_2N$, $OH$, $HO_3S$, $SO_3H$ substituents, bearing $D_1-N=N-$ group and $-N=N-D_2-NH-$ linked to a triazine with X, connected through a phenylene ($SO_3H$, $NCH_3$) to another triazine with Y and NH-L]

| Example No. | $D_1$ | Position 3,4 | $D_2$ | X | Y | L | Hue on cotton |
|---|---|---|---|---|---|---|---|
| 33 | 4-Cl-3-HO₃S-phenyl (with additional SO₃H) | 3 | SO₃H-phenyl | Cl | Cl | H | reddish navy |
| 34 | 4-Cl-3-HO₃S-phenyl (with additional SO₃H) | 3 | SO₃H-phenyl | F | Cl | 4-SO₃H-phenyl | reddish navy |
| 35 | 4-H₂NO₂S-phenyl | 3 | SO₃H-phenyl | Cl | Cl | 3-SO₃H-phenyl | navy |
| 36 | 4-(HO₃SO—H₄C₂—O₂S)-phenyl | 3 | SO₃H-phenyl | Cl | Cl | 4-SO₃H-phenyl | navy |
| 37 | 4-(HO₃SO—H₄C₂—O₂S)-phenyl | 4 | SO₃H-phenyl | Cl | Cl | 3-SO₃H-phenyl | navy |

EXAMPLE 38

23.9 g (0.1 mol) of 2-amino-5-hydroxynaphthalene-7-sulfonic acid, dissolved in 250 ml of water, were reacted with 18.4 g (0.1 mol) of cyanuric chloride at 0°-5° C. and pH 5–6. 10.1 g (0.05 mol) of 1-amino-3-methylaminobenzene-4-sulfonic acid were added, and the batch was maintained at 50° C. and pH 6–7 for 3 hours. 20.1 g (0.1 mol) of the diazonium product, produced in hydrochloric acid, of 4-methoxyaniline-2-sulfonic acid were added and coupled at pH 4–5. The resulting dye was salted out at pH 7 with 400 g of NaCl, filtered off with suction and dried at 60° C. under reduced pressure. It conforms to the formula

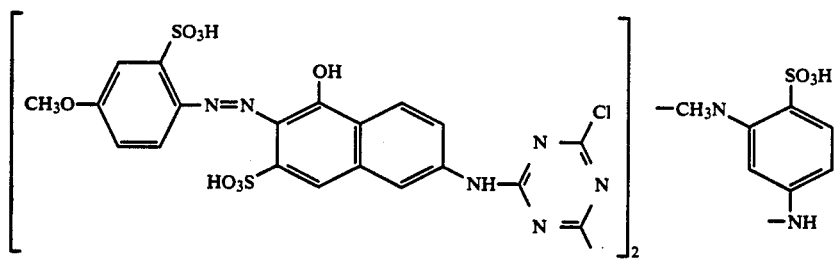

and dyes cotton in orange shades having good light and wet fastness properties.

The same method was used to obtain the dyes listed in Table 6.

TABLE 6

| Example No. | D | K | X | Z | Hue on cotton |
|---|---|---|---|---|---|
| 39 | phenyl | 5-hydroxy-8-amino-naphthalene-2,7-disulfonic acid with methyl | Cl | N-methyl-2-sulfo-4-amino-aniline | red |
| 40 | 4-methoxy-2-sulfo-phenyl with methyl | 5-hydroxy-8-amino-naphthalene-2,7-disulfonic acid with methyl | Cl | N-methyl-2-sulfo-4-amino-aniline | bluish red |
| 41 | 2-methyl-naphthalene-1,5-disulfonic acid | 5-hydroxy-8-amino-naphthalene-2,7-disulfonic acid with methyl | Cl | N-methyl-2-sulfo-4-amino-aniline | red |
| 42 | 2-methyl-naphthalene-1,5-disulfonic acid | 5-hydroxy-6-amino-naphthalene with methyl and $HO_3S$ | Cl | 5-sulfo-1,3-diamino-benzene | orange |
| 43 | phenyl | 5-hydroxy-8-amino-naphthalene-disulfonic acid with methyl | Cl | 1,2-diamino-4-($SO_2NHC_2H_4OSO_3H$)-benzene | red |

TABLE 6-continued

| Example No. | D | K | X | Z | Hue on cotton |
|---|---|---|---|---|---|
| 44 | 2-methylnaphthalene-1-sulfonic acid | 8-amino-1-hydroxy-6-sulfo-4-sulfo-naphthalene (NH at 8, OH at 1, SO$_3$H at 6, SO$_3$H at 4) | Cl | 1,3-phenylenediamine-5-sulfonic acid | red |
| 45 | 2-methylnaphthalene-1-sulfonic acid | 8-amino-1-hydroxy-3,6-disulfonaphthalene | Cl | 1,3-phenylenediamine-5-sulfonic acid | bluish red |
| 46 | 2-methyl-5-sulfonaphthalene-1-sulfonic acid | 8-amino-1-hydroxy-6-sulfo-4-sulfonaphthalene | Cl | 1,3-phenylenediamine-5-sulfonic acid | red |
| 47 | 2-methylbenzene-1-sulfonic acid | 8-amino-1-hydroxy-3,6-disulfonaphthalene | Cl | 2-methylamino-4-amino-benzenesulfonic acid | yellowish red |

EXAMPLE 48

20.2 g (0.1 mol) of 1-amino-3-methylaminobenzene-4-sulfonic acid were dissolved in 200 ml of ice-water at pH 7 and added at 0°–5° C. and pH 3–4 to the suspension of 18.4 g of cyanuric chloride in 200 ml of ice-water. After diazotizable amino groups were no longer detectable, 38.3 g (0.1 mol) of the diazonium product, produced in aqueous hydrochloric acid, of 2-aminonaphthalene-4,6,8-trisulfonic acid were added, and the batch was brought at 0°–5° C. to pH 6–7 by the addition of sodium bicarbonate. After the coupling had ended, 27.2 g (0.4 mol) of 25% strength by weight aqueous NH$_3$ solution were added, and the batch was stirred at 40° C. for 2 hours. The dye obtained conforms to the formula

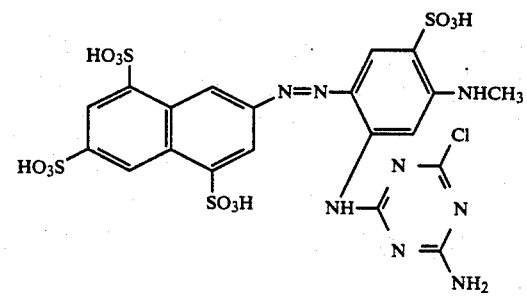

and dyes cotton in orange shades having good light and wet fastness properties.

The same method was used to obtain the dyes listed in Table 7.

TABLE 7

[Structure: D—N=N—benzene ring with SO₃H, NHCH₃, and NH-linked triazine bearing X and NH—L substituents]

| Example No. | D | X | L | Hue on cotton |
|---|---|---|---|---|
| 49 | 2-methyl-4-sulfo-phenyl (with SO₃H groups) | Cl | 3-sulfophenyl | reddish yellow |
| 50 | 2,4-disulfophenyl | Cl | 4-sulfophenyl | reddish yellow |
| 51 | 1,3,6-trisulfonaphthyl | Cl | H | reddish yellow |
| 52 | 1,5-disulfo-3-sulfonaphthyl | F | H | orange |

EXAMPLE 53

25.3 g (0.1 mol) of aniline-2,4-disulfonic acid were diazotized in 400 ml of ice-cooled hydrochloric acid solution. 0.1 mol of an aqueous solution (pH 7) of 1,3-phenylenediamine-5-sulfonic acid was added, and the batch was maintained at pH 5-6 and 5°-10° C. for 1 hour. After the coupling had ended, 40.5 g (0.22 mol) of cyanuric chloride were added, and the batch was maintained at pH 6-7 and 5°-10° C. for 1 hour. After free amino groups were no longer detectable, 35.6 g of aniline-4-sulfonic acid were added, and the batch was maintained at 35°-40° C. and pH 6-7 for 2 hours. The dye obtained was salted out with potassium chloride. It conforms to the formula

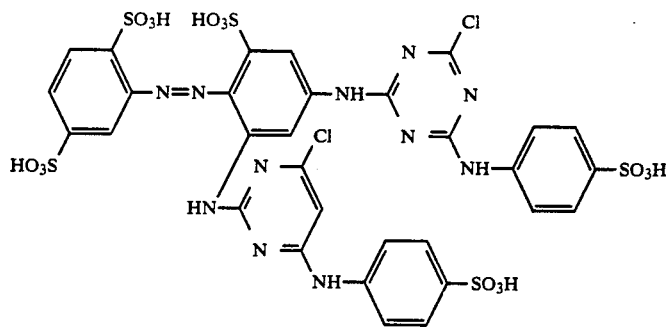

and dyes cotton in reddish yellow shades having good light and wet fastness properties.

EXAMPLE 54

39 g of cyanuric chloride were added to a solution of 124 g of the sodium salt of the compound of the formula The same method was used to obtain the dyes (as sodium salts) of the formula

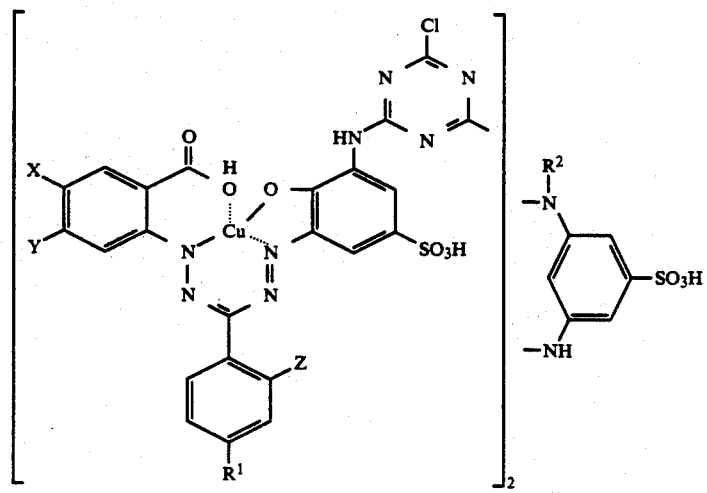

listed in Table 8. Applied by conventional exhaust methods they dye cellulose fibers in blue shades. The dyes are very readily soluble in water, are light- and wet-fast and show good stability to oxidative influences.

TABLE 8

| Ex. No. | X | Y | Z | R¹ | R² |
|---|---|---|---|---|---|
| 55 | SO₃H | H | H | H | H |
| 56 | H | SO₃H | H | H | CH₃ |
| 57 | H | SO₃H | H | F | H |
| 58 | H | SO₃H | H | F | CH₃ |
| 59 | SO₃H | H | H | F | H |
| 60 | SO₃H | H | H | F | CH₃ |
| 61 | H | SO₃H | SO₃H | H | H |
| 62 | SO₃H | H | SO₃H | H | H |

EXAMPLE 63

39 g of cyanuric chloride were added to a solution of 124 g of the sodium salt of the compound of the formula

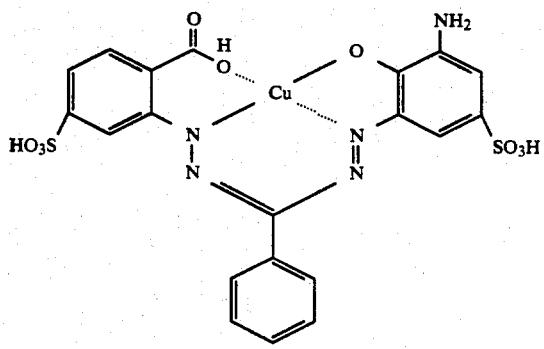

in 300 ml of water and 300 g of ice. The pH of the reaction mixture was maintained at 5–5.5 with sodium bicarbonate until the acylation had ended. After 2 hours 19 g of 3,5-diaminobenzenesulfonic acid, dissolved in 200 ml of water, were added. The suspension was heated to 60° C. and the pH was maintained at 7–8 by the addition of sodium bicarbonate. After 6 hours the resulting dye of the formula

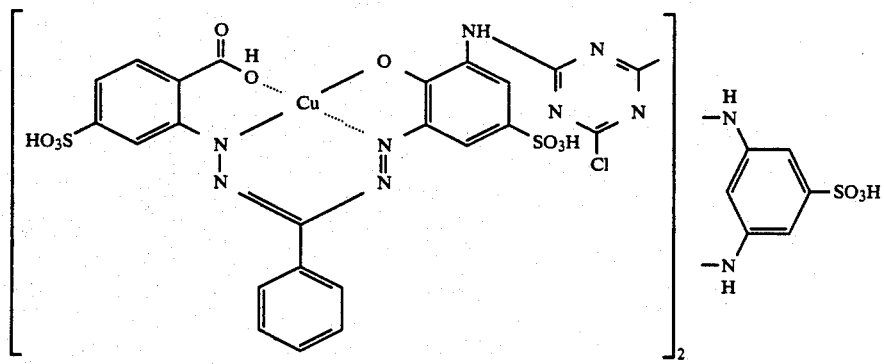

was salted out with sodium chloride in the form of its sodium salt, filtered off and dried. The dark blue dye powder obtained is very readily water-soluble and dyes cotton in bright blue shades. The dyeings are light- and wet-fast. They rae remarkably stable to oxidative influences.

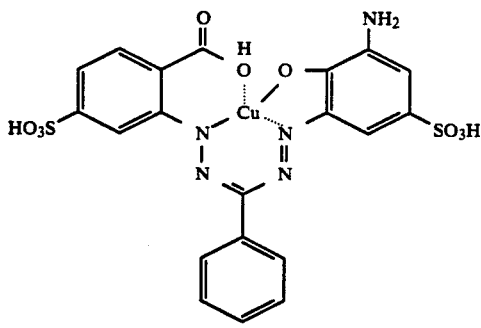

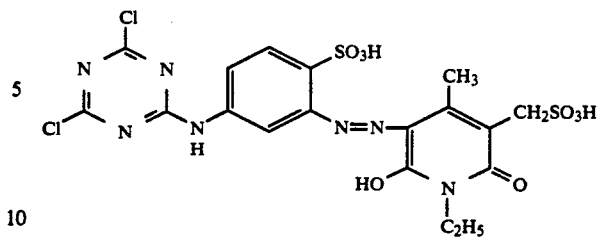

in 300 ml of water and 300 g of ice. The pH of the reaction mixture was maintained at 5–5.5 with sodium bicarbonate until the acylation had ended. After 2 hours obtained as described in Example 1a and dissolved beforehand in 500 ml of water. The reaction was maintained at 60° C. for 6 hours during which the pH was maintained at 7.0–7.5 by the addition of sodium bicarbonate. Sodium chloride was added to salt out the resulting dye of the formula

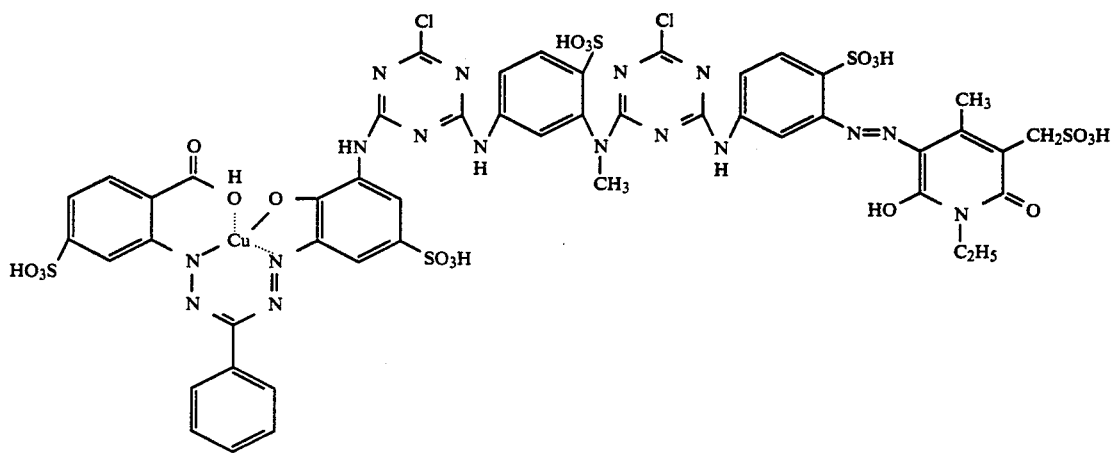

38 g of 4-amino-2-(N-methylamino)benzenesulfonic acid were added. The suspension was heated to 40° C. and the pH was maintained at 7–8. After 4 hours the resulting dye of the formula in the form of its sodium salt, which was filtered off and dried. The oliver dye powder obtained is very readily water-soluble and dyes cotton in bright olive shades. The dyeings are light- and wet-fast. They show remark-

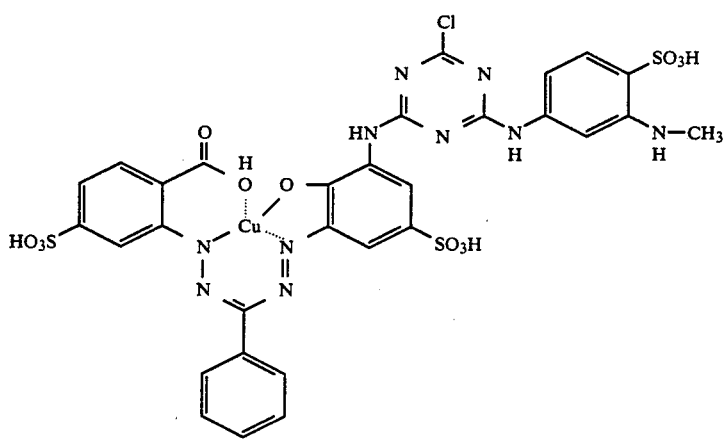

was reacted at 60° C. with 120 g of the dichlorotriazine dye of the formula able stability to oxidative influences.

The same method was used to obtain the dyes of the formula

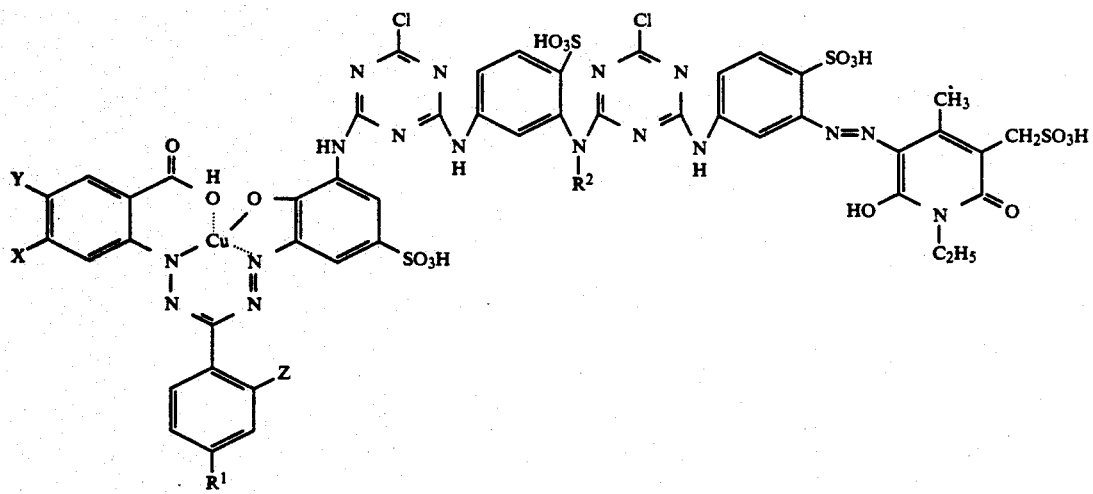

listed in Table 9. Applied by conventional exhaust methods they dye cellulose fibers in olive shades. The dyes are very readily soluble in water, are light- and wet-fast and show good stability to oxidative influences.

TABLE 9

| Ex. No. | X | Y | Z | R¹ | R² |
|---|---|---|---|---|---|
| 64 | H | SO₃H | H | H | CH₃ |
| 65 | H | SO₃H | H | H | C₂H₅ |
| 66 | H | H | SO₃H | H | CH₃ |
| 67 | H | H | SO₃H | SO₃H | CH₃ |
| 68 | SO₃H | H | H | H | C₂H₅ |
| 69 | SO₃H | H | H | F | CH₃ |
| 70 | SO₃H | H | H | F | C₂H₅ |
| 71 | SO₃H | H | SO₃H | H | CH₃ |
| 72 | H | SO₃H | SO₃H | H | CH₃ |

EXAMPLE 73

39 g of cyanuric chloride were added to a solution of 124 g of the sodium salt of the compound of the formula

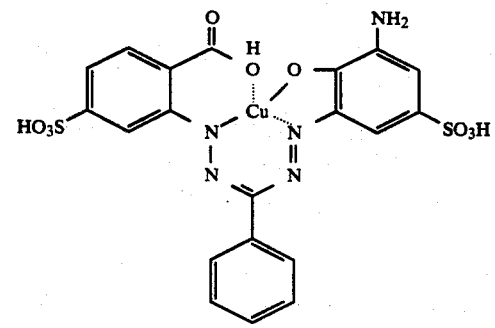

in 300 ml of water and 300 g of ice. The pH of the reaction mixture was maintained at 5–5.5 with sodium bicarbonate until the acylation had ended. After 2 hours 30 g of N-(3,4-diaminophenylsulfonyl)taurine, dissolved in 200 ml of water, were added. The suspension was heated to 60° C. and the pH was maintained at 7–8 by the addition of sodium bicarbonate. After 6 hours the resulting dye of the formula

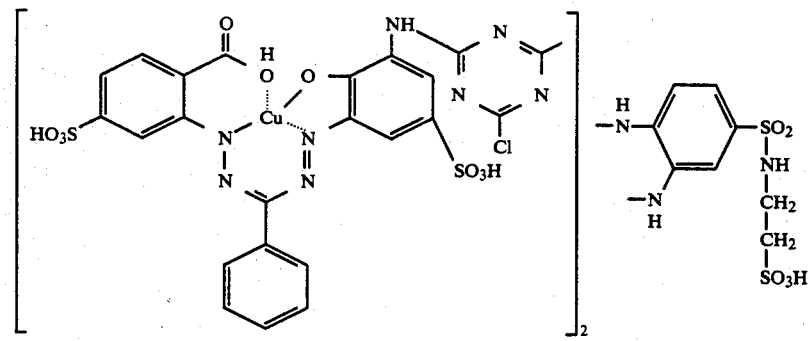

was salted out with sodium chloride in the form of its sodium salt, filtered off and dried. The dark blue dye powder obtained is very readily water-soluble and dyes cotton in bright blue shades. The dyeings are light- and wet-fast. They show remarkable stability to oxidative influences.

The same method was used to obtain the dyes (as sodium salts) of the formula

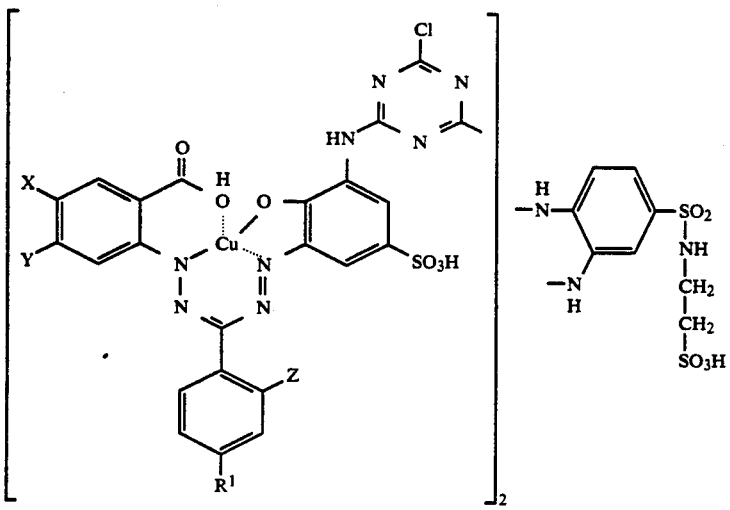

listed in Table 10. Applied by conventional exhaust methods they dye cellulose fibers in blue shades. The dyes are very readily soluble in water, are light- and wet-fast and show good stability to oxidative influences.

TABLE 10

| Ex. No. | X | Y | Z | R¹ | R² |
|---|---|---|---|---|---|
| 74 | SO₃H | H | H | H | H |
| 75 | H | SO₃H | H | F | H |
| 76 | SO₃H | H | H | F | H |
| 77 | H | SO₃H | SO₃H | H | H |
| 78 | SO₃H | H | SO₃H | H | H |

EXAMPLE 79

39 g of cyanuric chloride were added to a solution of 124 g of the sodium salt of the compound of the formula

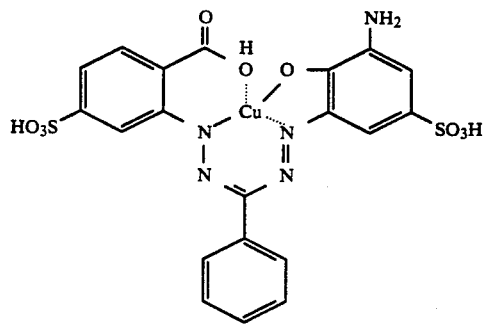

in 300 ml of water and 300 g of ice. The pH of the reaction mixture was maintained at 5–5.5 with sodium bicarbonate until the acylation had ended. After 2 hours 19 g of 3,4-diaminobenzenesulfonic acid, dissolved in 200 ml of water, was added. The suspension was heated to 60° C. and the pH was maintained at 7–8 by the addition of sodium bicarbonate. After 6 hour the resulting dye of the formula

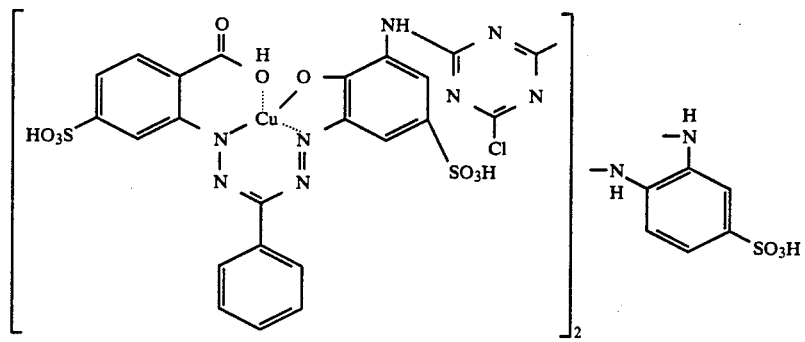

was salted out with sodium chloride in the form of its sodium salt, filtered off and dried. The dark blue dye product obtained is very readily water-soluble and dyes cotton in bright blue shades. The dyeings are light- and wet-fast. They show remarkable stability to oxidative influences.

The same method was used to obtain the dyes (as sodium salts) of the formula

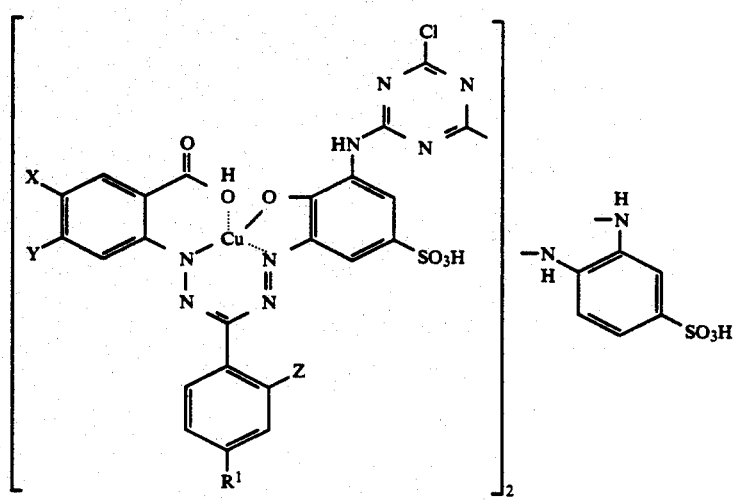

as listed in Table 11. Applied by conventional exhaust methods they dye cellulose fibers in blue shades. The dyes are very readily soluble in water, are light- and wet-fast and show good stability to oxidative influences.

TABLE 11

| Ex. No. | X | Y | Z | $R^1$ | $R^2$ |
|---|---|---|---|---|---|
| 80 | $SO_3H$ | H | H | H | H |
| 81 | H | $SO_3H$ | H | F | H |
| 82 | $SO_3H$ | H | H | F | H |
| 83 | H | $SO_3H$ | $SO_3H$ | H | H |
| 84 | $SO_3H$ | H | $SO_3H$ | H | H |

We claim:

1. A reactive dye of the formula I

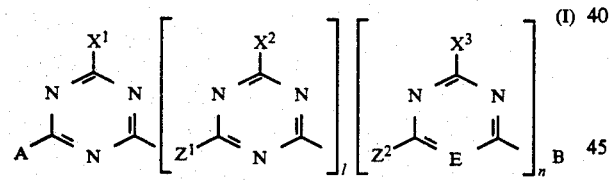

wherein
l is 0 or 1,
n is 0 or 1,
E is nitrogen,
A is the radical of a nonmetallized azo dye attached to the triazine ring via an imino or $C_1$-$C_4$-alkylimino group,
B is the radical of a nonmetallized azo dye different from A, or of a foremazan dye which in either case is bonded to the triazine ring via an imino or $C_1$-$C_4$-alklimino group,
$X^1$ and $X^2$ are both chlorine,
$X^3$ is fluorine or chlorine, and
$Z^1$ and $Z^2$ are identical or different and each is independently of the other a radical of the formula

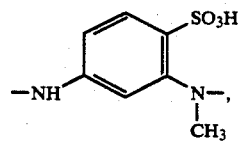

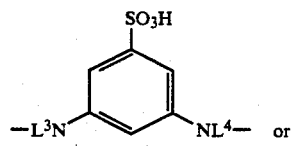

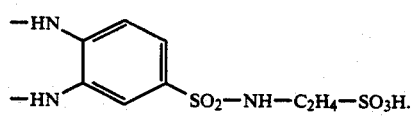

where $L^3$ and $L^4$ are identical or different and each is independently of the other hydrogen or unsubstituted or cyano- or hydroxy-substituted $C_1$-$C_4$-alkyl,
with the provisos that l is 0 when n is 1, and n is 0 when l is 1.

2. A process of dyeing or printing hydroxyl- or nitrogen-containing substances, comprising applying thereto a reactive dye as claimed in claim 1.

* * * * *